US012610114B2

(12) United States Patent
Nakamura et al.

(10) Patent No.: US 12,610,114 B2
(45) Date of Patent: Apr. 21, 2026

(54) VEHICULAR CAMERA

(71) Applicant: Panasonic Automotive Systems Co., Ltd., Kanagawa (JP)

(72) Inventors: Ken Nakamura, Kanagawa (JP); Shingo Kameyama, Hyogo (JP); Kazuhiro Abe, Tokyo (JP)

(73) Assignee: Panasonic Automotive Systems Co., Ltd., Kanagawa (JP)

( * ) Notice: Subject to any disclaimer, the term of this patent is extended or adjusted under 35 U.S.C. 154(b) by 65 days.

(21) Appl. No.: 18/796,037

(22) Filed: Aug. 6, 2024

(65) Prior Publication Data

US 2025/0056105 A1    Feb. 13, 2025

(30) Foreign Application Priority Data

Aug. 7, 2023    (JP) ................................. 2023-128781
Aug. 7, 2023    (JP) ................................. 2023-128782

(51) Int. Cl.
 *H04N 23/51*    (2023.01)
 *G03B 30/00*    (2021.01)

(52) U.S. Cl.
 CPC ............. *H04N 23/51* (2023.01); *G03B 30/00* (2021.01)

(58) Field of Classification Search
 CPC ................................ H04N 23/51; G03B 30/00
 USPC ........................................................ 348/148
 See application file for complete search history.

(56) References Cited

U.S. PATENT DOCUMENTS

| | | | |
|---|---|---|---|
| 2006/0193617 A1* | 8/2006 | Oya ........................ | G03B 15/05 396/72 |
| 2011/0199485 A1* | 8/2011 | Nakamura ........... | G02B 13/001 348/148 |
| 2012/0140101 A1* | 6/2012 | Afshari .................. | H04N 23/57 348/335 |
| 2015/0365569 A1* | 12/2015 | Mai ........................ | G03B 17/55 348/373 |
| 2019/0312997 A1* | 10/2019 | Fujii ...................... | H04N 23/55 |
| 2021/0127532 A1* | 4/2021 | Persson .................. | H04N 23/57 |
| 2022/0066290 A1* | 3/2022 | Kim ....................... | G03B 13/36 |
| 2022/0159160 A1* | 5/2022 | Abe ........................ | H04N 23/52 |
| 2022/0252964 A1* | 8/2022 | Kim ....................... | H04N 23/57 |
| 2022/0407995 A1* | 12/2022 | Kong ...................... | B60R 11/04 |
| 2023/0008374 A1* | 1/2023 | Owaki ................... | G03B 30/00 |
| 2024/0187714 A1* | 6/2024 | Alonso Oliva ........ | H04N 23/57 |
| 2024/0276083 A1* | 8/2024 | Nakamura .............. | G02B 7/02 |

FOREIGN PATENT DOCUMENTS

| | | |
|---|---|---|
| JP | 2018197798 A | 12/2018 |
| JP | 3234888 U | 11/2021 |

* cited by examiner

*Primary Examiner* — Matthew David Kim
(74) *Attorney, Agent, or Firm* — Seed Intellectual Property Law Group LLP

(57)    ABSTRACT

The present disclosure relates to a vehicular camera. A first layer of a planar member includes a fifth surface opposite to a third surface in the second region. The fifth surface of the first layer of the planar member is fixed to a first flange surface of a flange portion of a lens unit, and is fixed to an end portion of a second tubular portion of a housing. A second-layer end surface of a second layer of the planar member has at least one second-layer protrusion protruding toward an inner surface of the second tubular portion of the housing and abutting on the inner surface of the second tubular portion of the housing.

16 Claims, 30 Drawing Sheets

VEHICULAR CAMERA

CROSS-REFERENCE TO RELATED APPLICATIONS

This application is based on and claims priority under 35 USC 119 from Japanese Patent Application No. 2023-128781 filed on Aug. 7, 2023 and No. 2023-128782 filed on Aug. 7, 2023, the entire content of which is incorporated herein by reference.

TECHNICAL FIELD

The present disclosure relates to a vehicular camera.

BACKGROUND ART

With demands for improvements in vehicle safety, introduction of autonomous driving functions, and the like in recent years, development of vehicular cameras that are mounted on vehicles and capture the inside and outside of the vehicles have become active as disclosed on, for example, JP2018-197798A and JP3234888U.

Required levels relating to safety, automatic driving functions, and the like, which are required for vehicles, are improved, and further improvement in performance and the like are also required for vehicular cameras.

The present disclosure relates to a technique for providing a new vehicular camera.

SUMMARY

A vehicular camera includes a lens unit including a first tubular portion having a first tubular shape, at least one lens disposed inside the first tubular portion, and a flange portion disposed outside the first tubular portion so as to extend outward with reference to an optical axis of the at least one lens over an entire periphery of the optical axis, a circuit board including a first surface and a second surface opposite to the first surface, an imaging element disposed on the optical axis of the lens and on the first surface of the circuit board, a housing having a second tubular portion having a second tubular shape along the optical axis and configured to accommodate at least the circuit board and the imaging element inside the second tubular portion, and a planar member disposed around the first tubular portion of the lens unit and having a third surface and a fourth surface opposite to the third surface and closer to the circuit board than the third surface. The flange portion of the lens unit includes a first flange surface, a second flange surface opposite to the first flange surface and located in an internal space of the second tubular portion of the housing, and a flange end surface configured to connect the first flange surface and the second flange surface. The planar member includes a first layer including a first-layer end surface having a first thickness, the first-layer end surface being disposed between the third surface and the fourth surface and around the first tubular portion, and a second layer having a smaller area than the first layer and including a second-layer end surface having a second thickness, the second-layer end surface being disposed between the third surface and the fourth surface and in at least a part of a periphery of the first tubular portion, and being disposed along the first layer and closer to the circuit board than the first layer. The first layer of the planar member includes a first region in which the second layer is disposed and a second region in which the second layer is not disposed. The first layer of the planar member includes a fifth surface opposite to the third surface in the second region. The fifth surface of the first layer of the planar member is fixed to the first flange surface of the flange portion of the lens unit, and is fixed to an end portion of the second tubular portion of the housing. The second-layer end surface of the second layer of the planar member has at least one second-layer protrusion protruding toward an inner surface of the second tubular portion of the housing and abutting on the inner surface of the second tubular portion of the housing.

According to the present disclosure, a vehicular camera that can be manufactured at low cost and ensures excellent imaging performance is provided.

BRIEF DESCRIPTION OF DRAWINGS

FIG. 2 is a block diagram illustrating a connection example of the vehicular cameras provided in the vehicle shown in FIG. 1, a camera ECU, and a display;

FIG. 5 is a block diagram illustrating a connection example of the vehicular camera provided in the vehicle shown in FIG. 3, a camera ECU, and a display device;

DESCRIPTION OF EMBODIMENTS

Hereinafter, embodiments that specifically disclose a vehicular camera according to the present disclosure will be described in detail with reference to the drawings as appropriate. However, unnecessarily detailed descriptions may be omitted. For example, detailed descriptions of already well-known matters and redundant descriptions of substantially the same configuration may be omitted. This is to avoid unnecessary redundancy of the following description and facilitate understanding of those skilled in the art. It should be noted that the accompanying drawings and the following description are provided for those skilled in the art to sufficiently understand the present disclosure, and are not intended to limit the subject matter described in the claims. (Vehicle on which Vehicular Camera is Mounted)

Figure 1:
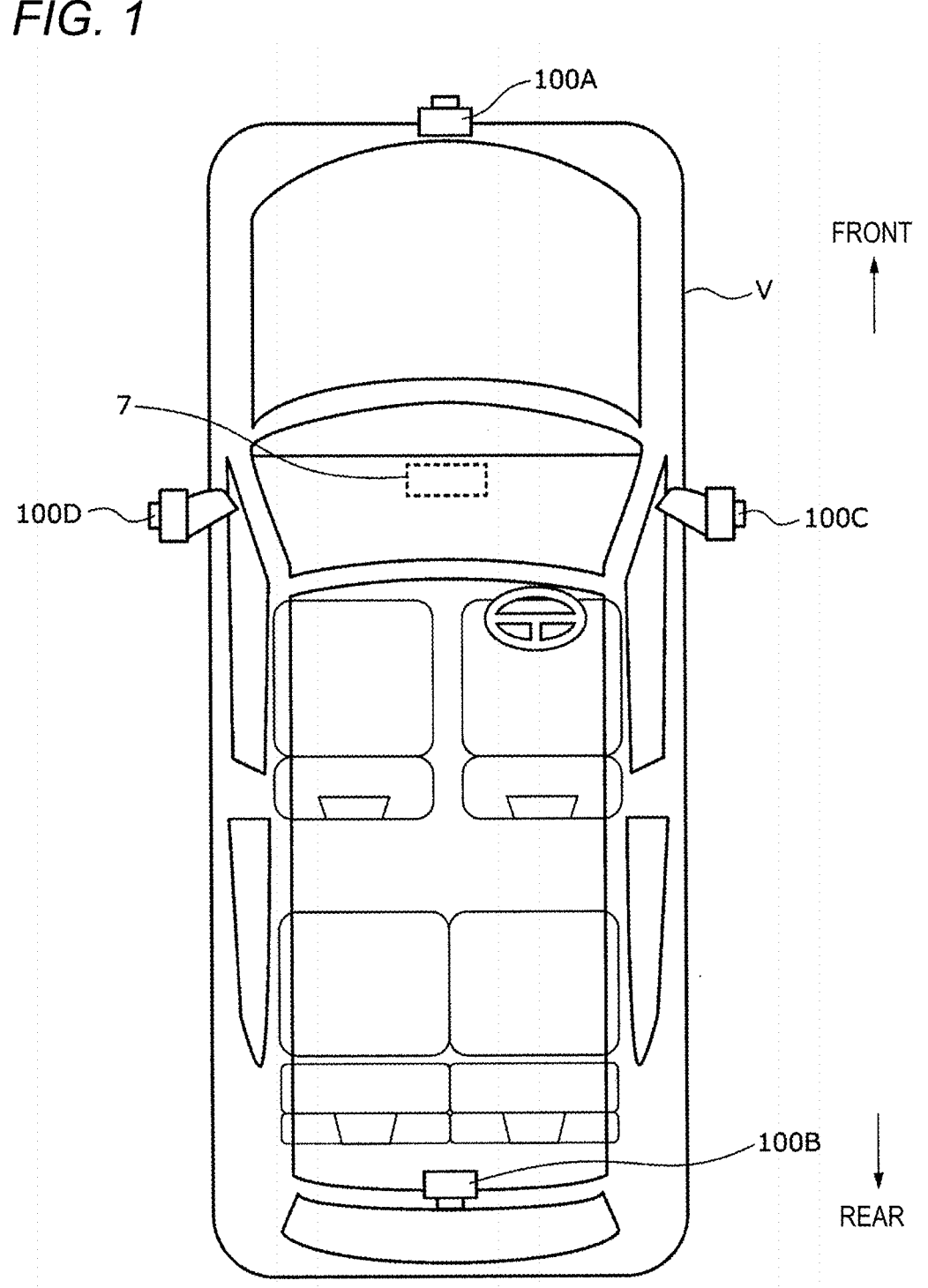
FIG. 1 is an example of a vehicle, and is a top view of the vehicle on which vehicular cameras are mounted.

FIG. 1 is an example of a vehicle, and is a top view of the vehicle on which vehicular cameras are mounted. As a vehicular camera 100, a vehicular camera 100A, a vehicular camera 100B, a vehicular camera 100C, and a vehicular camera 100D are mounted on a vehicle V. The vehicular camera 100A is a front camera, the vehicular camera 100B is a rear camera, the vehicular camera 100C is a right side camera, and the vehicular camera 100D is a left side camera. The vehicular cameras 100A to 100D are, for example, wide-angle cameras having an angle of view of about 180°, and are disposed to capture images showing the entire periphery of the vehicle V.

For example, the vehicular camera 100A is provided in a front grille of the vehicle V, and captures an image of a front region in a direction of looking down obliquely with respect to the ground. The vehicular camera 100B is provided in a roof spoiler of the vehicle V, and captures an image of a rear region in a direction of looking down obliquely with respect to the ground. The vehicular camera 100C and the vehicular camera 100D are provided in side mirrors of the vehicle V, and capture images of lateral regions in directions of looking down obliquely with respect to the ground, respectively.

Figure 2:
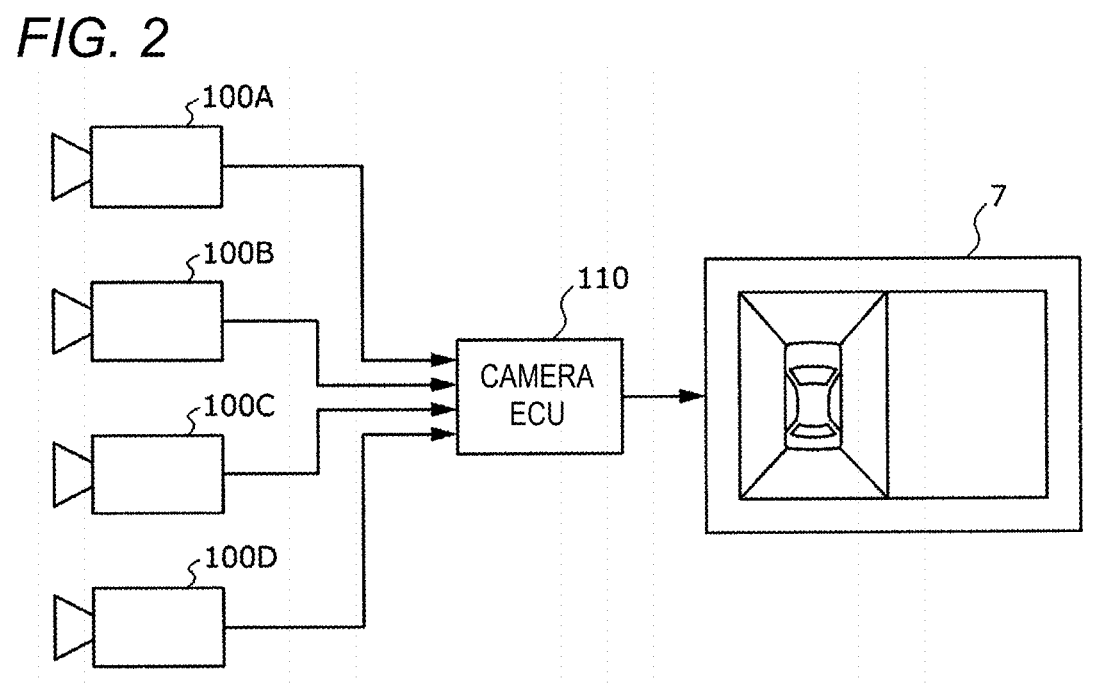

FIG. 2 is a block diagram illustrating a connection example of the vehicular cameras 100A to 100D provided in the vehicle V shown in FIG. 1, a camera ECU 110, and a display 7. The camera electronic control unit (ECU) 110 in FIG. 2 synthesizes the images captured by the vehicular cameras 100A to 100D, and displays a synthesized image on the display 7 of a navigation system disposed on an instrument panel, for example. An occupant can visually recognize the display 7 and check a situation around the vehicle V.

Figure 3:
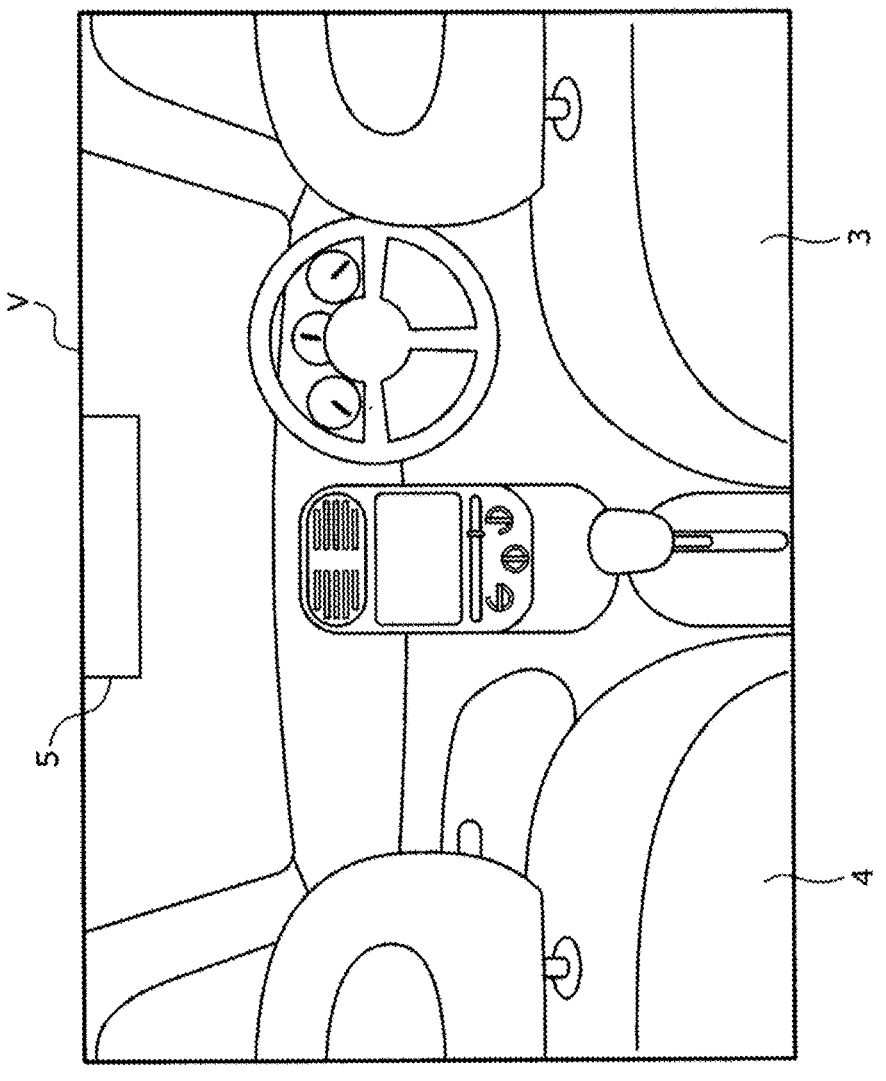
FIG. 3 is another example of the vehicle, and is a schematic diagram of a cabin of the vehicle on which a vehicular camera is mounted.
Figure 4:
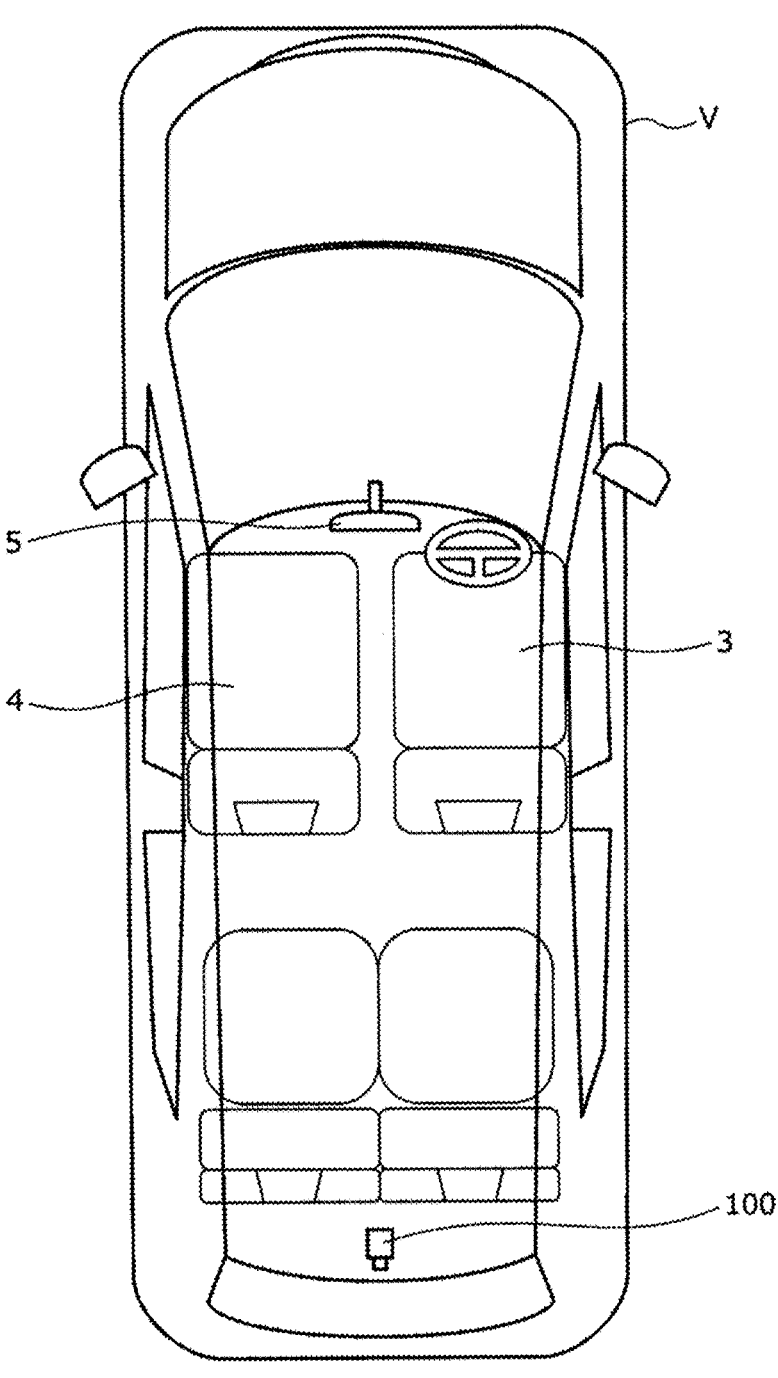
FIG. 4 is a top view of the vehicle in FIG. 3.
Figure 5:
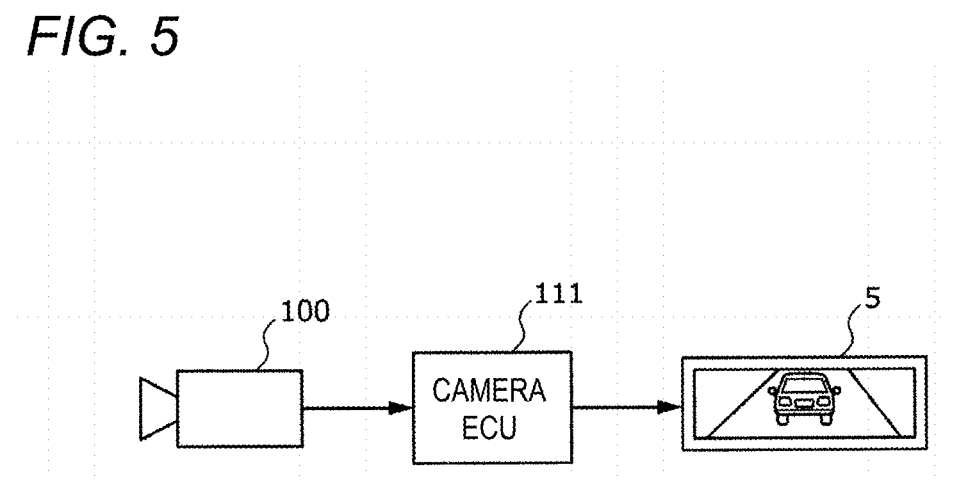

FIG. 3 is another example of the vehicle, and is a schematic diagram of a cabin of the vehicle on which the vehicular camera is mounted, and FIG. 4 is a top view of the vehicle in FIG. 3. The vehicle V includes a display device 5 (for example, an electronic rearview mirror) at an attachment position of a rearview mirror which is a front portion between a driver's seat 3 and a passenger seat 4 in the cabin. Further, the vehicle V is provided with the vehicular camera 100 at a rear side of a vehicle body. FIG. 5 is a block diagram illustrating a connection example of the vehicular camera

100 provided in the vehicle V shown in FIG. 3, a camera ECU 111, and the display device 5. The camera ECU 111 in FIG. 4 processes an image captured by the vehicular camera 100, and the display device 5 displays the image. The occupant can visually recognize the display device 5 and check a rear situation of the vehicle V.

First Embodiment

Figure 6:
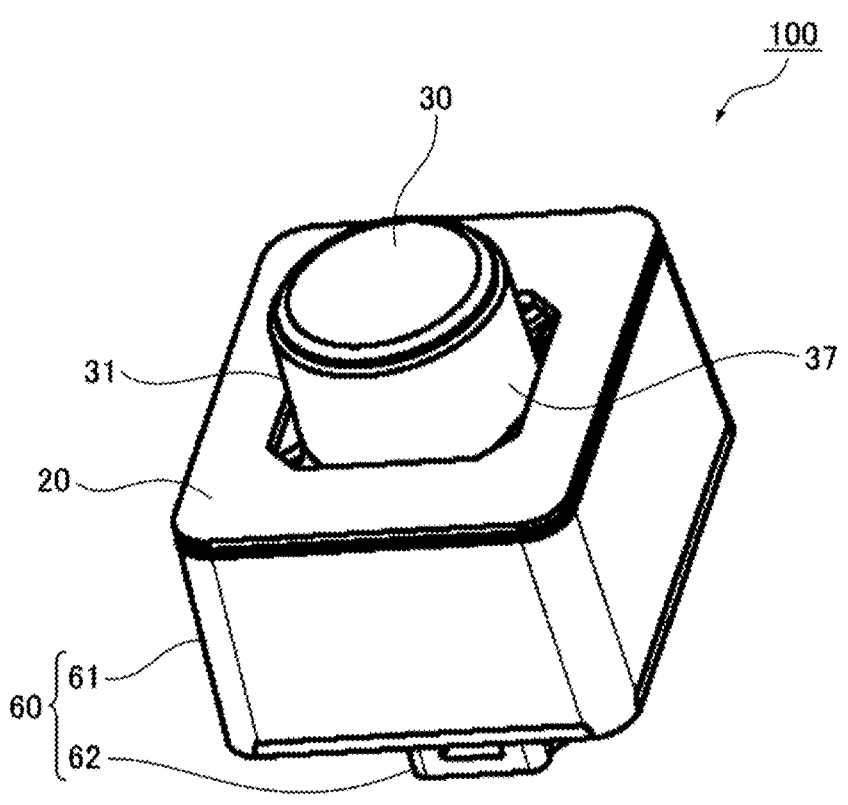
FIG. 6 is a top perspective view of a vehicular camera according to a first embodiment.
Figure 6:
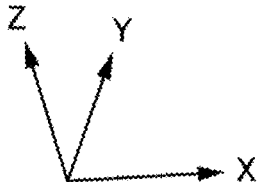
Figure 7:
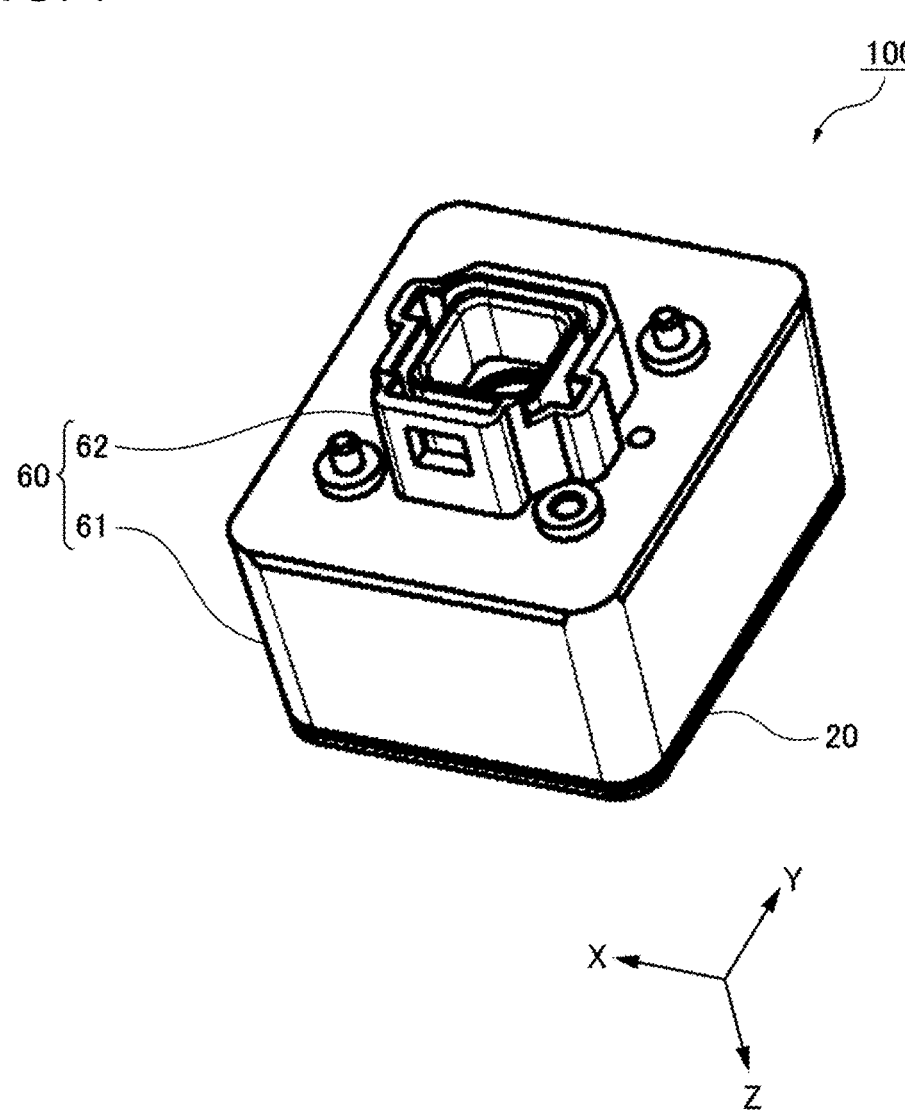
FIG. 7 is a bottom perspective view of the vehicular camera according to the first embodiment.
Figure 8:
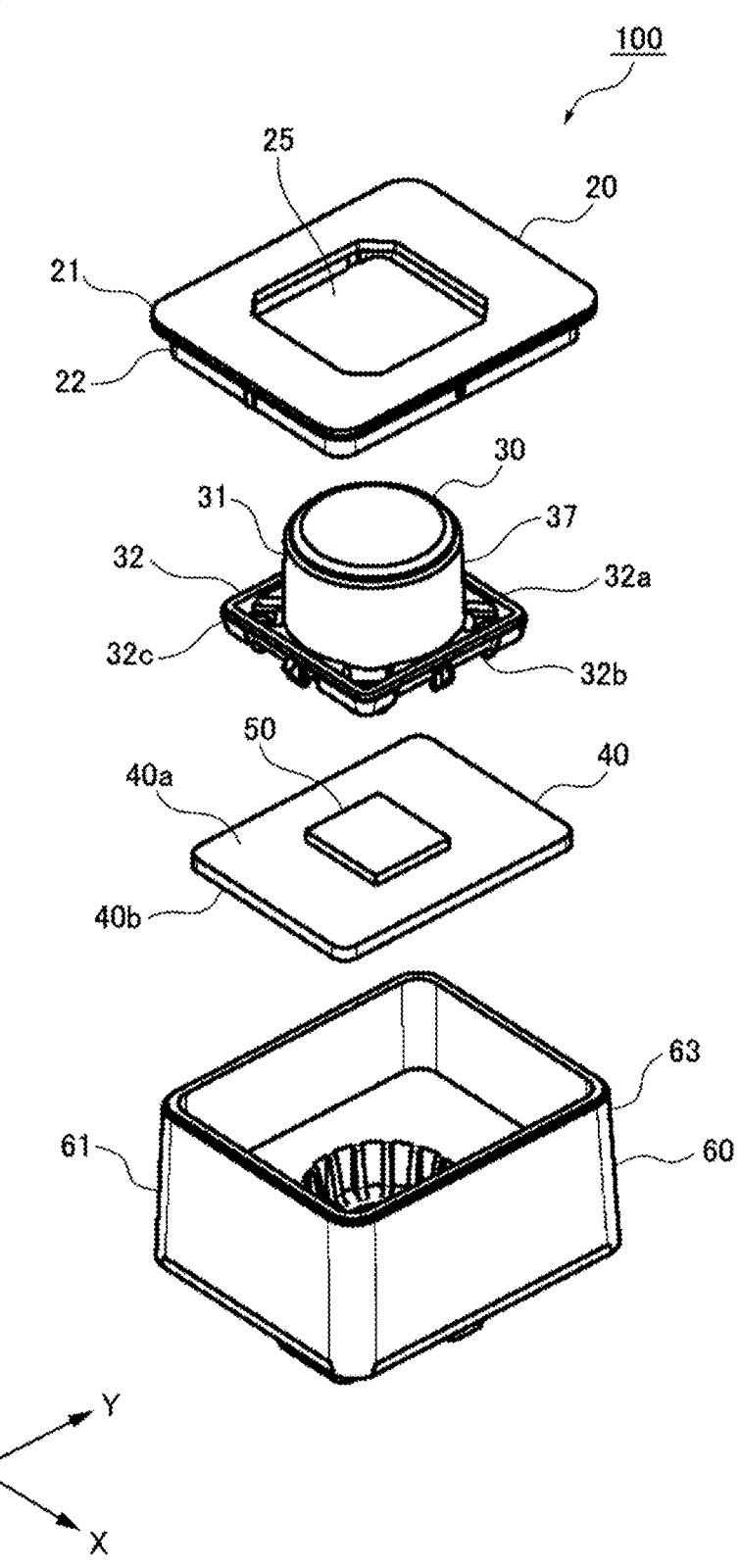
FIG. 8 is an exploded perspective view of the vehicular camera according to the first embodiment.
Figure 9:
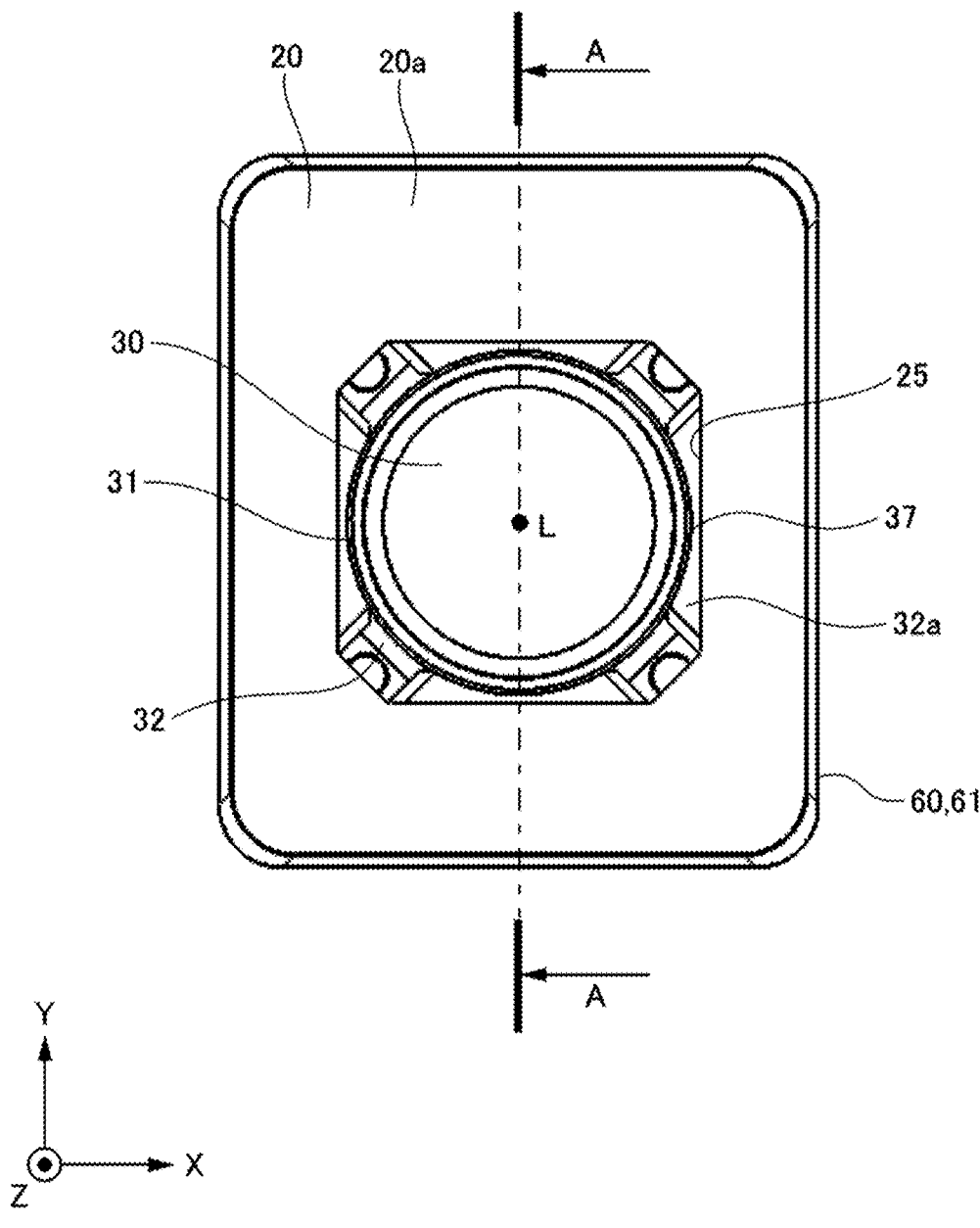
FIG. 9 is a top view of the vehicular camera according to the first embodiment.
Figure 10:
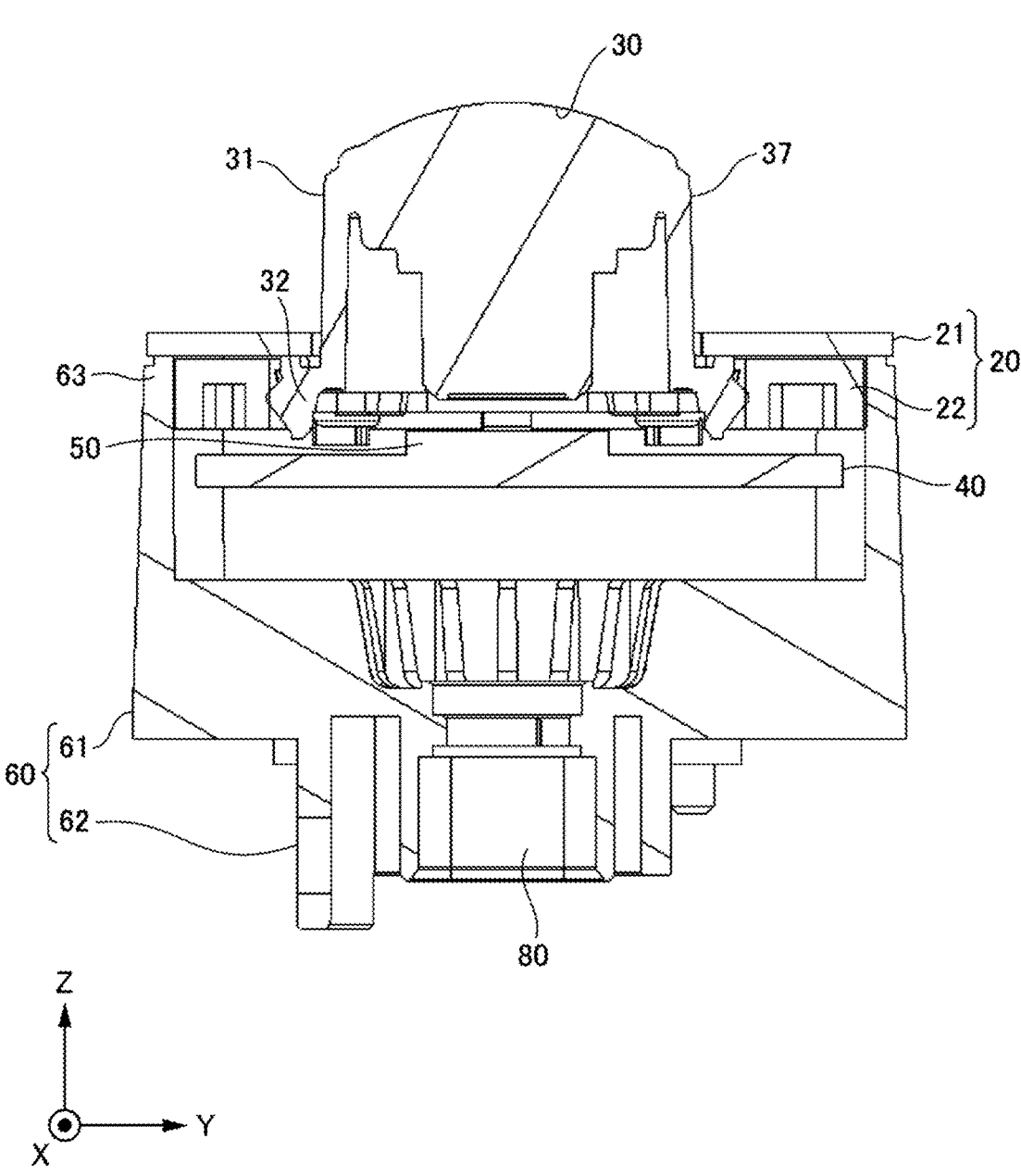
FIG. 10 is a cross-sectional view taken along a line A-A in FIG. 9.

FIG. 6 is a top perspective view of the vehicular camera 100 according to a first embodiment. FIG. 7 is a bottom perspective view of the vehicular camera 100 according to the first embodiment. FIG. 8 is an exploded perspective view of the vehicular camera 100 according to the first embodiment. FIG. 9 is a top view of the vehicular camera 100 according to the first embodiment. FIG. 10 is a cross-sectional view taken along a line A-A in FIG. 9. Coordinates including an X axis along one side of the vehicular camera 100, a Y axis orthogonal to the X axis and along another side of the vehicular camera 100, and a Z axis orthogonal to the X axis and the Y axis and along a height direction of the vehicular camera 100 are defined, and are used in the following description.

The vehicular camera 100 according to the present embodiment includes a ring member 20 which is a planar member, a lens unit 30, a circuit board 40, an imaging element 50, and a housing 60.

The ring member 20 is implemented by a rectangular annular member in a plan view (a line of sight when the vehicular camera 100 is viewed along the Z-axis, the same applies hereinafter), and is welded to the lens unit 30 and the housing 60 by laser welding. An inner peripheral surface of the ring member 20 faces an outer peripheral surface of a first tubular portion 37 that constitutes a lens barrel 31 of the lens unit 30 to be described later. An inner diameter of the ring member 20 has a length that allows the first tubular portion 37 (the lens barrel 31) of the lens unit 30 to be inserted.

The ring member 20 is formed of a resin material having predetermined light transmittance. The resin material is made of a material containing a light-transmitting resin. For example, the light-transmitting resin is formed of a polyester resin, a polyolefin resin, a polyamide resin, a vinyl chloride resin, a fluorine resin, or the like. Examples of the polyester resin include polybutylene terephthalate (PBT) and polyethylene terephthalate (PET). Examples of the polyolefin resin include polyethylene and polypropylene. One type of light-transmitting resin or a plurality of types of light-transmitting resins may be used. In addition, a coloring material, a filler, or both may be contained in a main light-transmitting resin as long as a transmission performance of a certain level or more can be achieved.

The lens unit 30 includes the first tubular portion 37 that constitutes the lens barrel 31 having a tubular shape and has a first tubular shape, and at least one lens (not shown) disposed inside the first tubular portion 37. The first tubular portion 37 has a tubular shape, and holds a lens group including, for example, a plurality of lenses inside the first tubular portion 37. The respective lenses in the lens group are arranged in a state in which respective optical axes L (axes extending in a direction perpendicular to the paper in FIG. 9 and along the Z axis) are aligned with each other, and constitute the lens group used for capturing images of the inside and outside of a vehicle body of a vehicle.

The lens unit 30 has a flange-shaped flange portion 32 protruding from the outer peripheral surface toward the outside of the first tubular portion 37. The flange portion 32 is disposed outside the first tubular portion 37 so as to extend outward with reference to the optical axis L over an entire periphery around the optical axis L, and a cross section thereof along a radial direction has a quadrilateral shape. At least a part of the flange portion 32 is joined to the housing 60 via the ring member 20. A relationship between the lens unit 30 and the housing 60 will be described later.

The flange portion 32 has a first flange surface 32*a*, a second flange surface 32*b* opposite to the first flange surface 32*a* and located in an internal space of a large-diameter tubular portion 61 of the housing 60 to be described later, and a flange end surface 32*c* connecting the first flange surface 32*a* and the second flange surface 32*b*.

At least the first flange surface 32*a* of the flange portion 32 of the lens unit 30 is formed of, for example, a resin having a predetermined light absorptivity. The resin is made of a material containing a light-absorbing resin. As the light-absorbing resin, for example, a polyamide-based resin, an olefin-based resin, a vinyl-based resin, a styrene-based resin, an acrylic-based resin, a polyester-based resin, a polycarbonate-based resin, a polyarylate-based resin, a poly-sulfone-based resin, a polyphenylene oxide-based resin, a polyether sulfone-based resin, or a polyetherimide-based resin can be used. One type of light-absorbing resin or a plurality of types of light-absorbing resins may be used. A main light-absorbing resin may contain an absorbent that absorbs laser light, a coloring material, or both.

Since the first flange surface 32*a* of the flange portion 32 is made of the light-absorbing resin, transmission of light into the internal space can be reduced. That is, the trans-mission of light from the outside of the vehicular camera 100 to the inside of the vehicular camera 100 can be reduced. Therefore, the halation of the imaging element 50 due to the transmitted light can be prevented. The entire flange portion 32 or the entire lens unit 30 may be formed of the light-absorbing resin.

The circuit board 40 is disposed in the internal space of the housing 60 and has a first surface 40*a* and a second surface 40*b* opposite to the first surface 40*a*. However, two or more circuit boards may be provided.

The imaging element 50 is disposed on the first surface 40*a* of the circuit board 40 and on the optical axis L of at least one lens of the lens units 30. By guiding light from the outside to the imaging element 50, the imaging element 50 can capture an image.

The housing 60 is a tubular member having the internal space, and serves to support the lens unit 30 directly or indirectly in some cases and accommodate at least the circuit board 40 and the imaging element 50. The housing 60 has the large-diameter tubular portion 61 having a second tubu-lar shape along the optical axis L, and a small-diameter tubular portion 62 along the optical axis L. The large-diameter tubular portion 61 constituting a second tubular portion has a larger cross-sectional area than the small-diameter tubular portion 62, and has a rectangular cross section. The large-diameter tubular portion 61 accommo-dates at least the circuit board 40 and the imaging element 50 therein. The small-diameter tubular portion 62 mainly accommodates a connector 80 that secures electrical con-nection with the outside of the vehicular camera 100 (see FIG. 10). The large-diameter tubular portion 61 and the small-diameter tubular portion 62 may be integrally formed by using a resin to be described later, and the large-diameter tubular portion 61 and the small-diameter tubular portion 62 prepared individually in advance may be joined by a method such as welding or screwing. Although the housing 60 has a rectangular tubular shape in the present embodiment, the shape is not limited thereto, and may be a polygonal tubular shape other than the rectangular tubular shape, a circular or elliptical tubular shape, or another tubular shape.

An end portion 63 of the large-diameter tubular portion 61 in the housing 60 is formed of a resin having a light absorptivity. The resin is made of a material containing a light-absorbing resin. As the light-absorbing resin, for example, a polyamide-based resin, an olefin-based resin, a vinyl-based resin, a styrene-based resin, an acrylic-based resin, a polyester-based resin, a polycarbonate-based resin, a polyarylate-based resin, a polysulfone-based resin, a poly-phenylene oxide-based resin, a polyether sulfone-based resin, or a polyetherimide-based resin can be used. One type of light-absorbing resin or a plurality of types of light-absorbing resins may be used. A main light-absorbing resin may contain an absorbent that absorbs laser light, a coloring material, or both.

Since the housing 60 is made of a material containing a light-absorbing resin, the transmission of light into the internal space of the housing 60 can be reduced. That is, the transmission of light from the outside of the vehicular camera 100 to the inside of the vehicular camera 100 can be reduced. Therefore, the halation of the imaging element 50 due to the transmitted light can be prevented. The entire large-diameter tubular portion 61 or the entire housing 60 may be formed of the light-absorbing resin.

Figure 11:
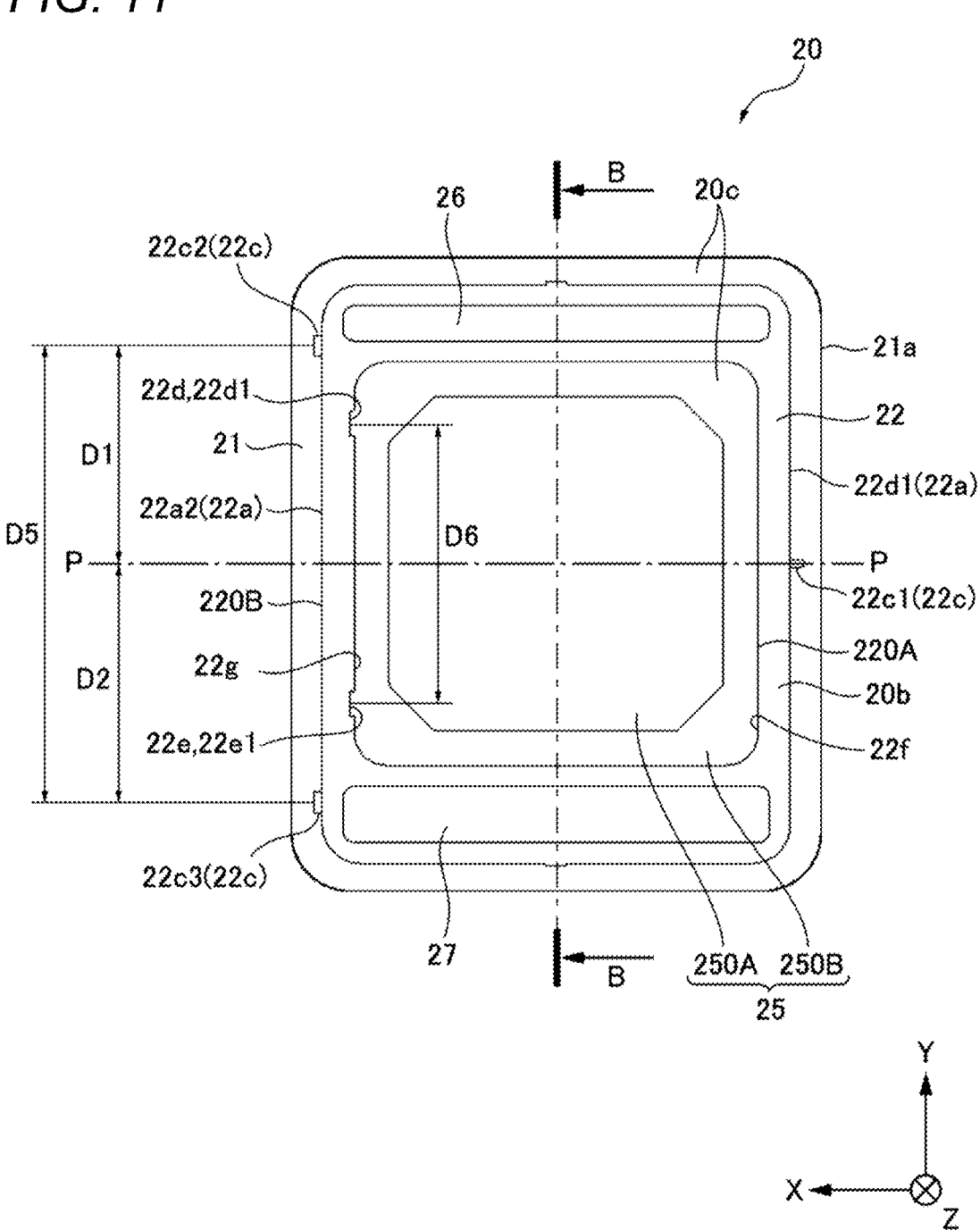
FIG. 11 is a bottom view of a ring member.
Figure 12:
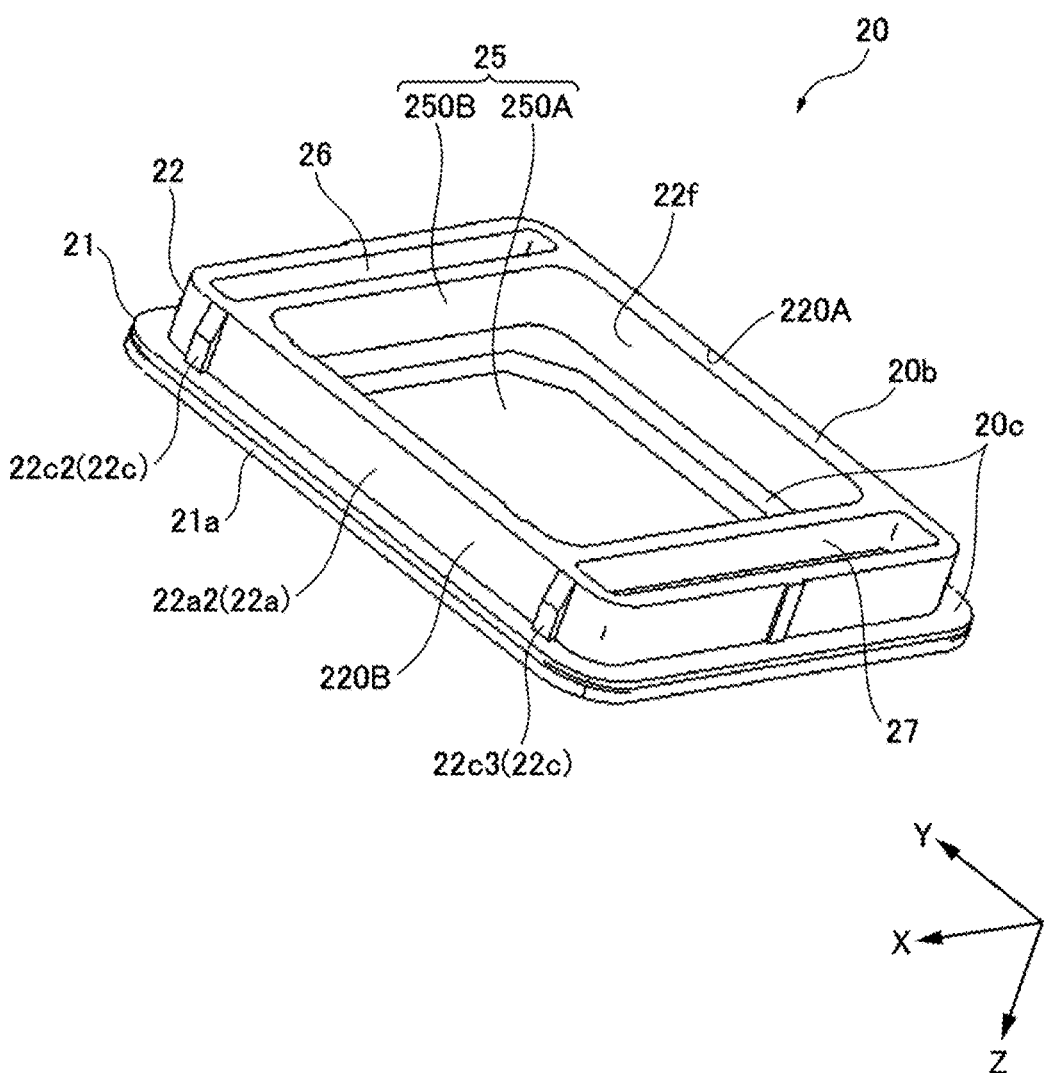
FIG. 12 is a perspective view of the ring member viewed from one direction.
Figure 13:
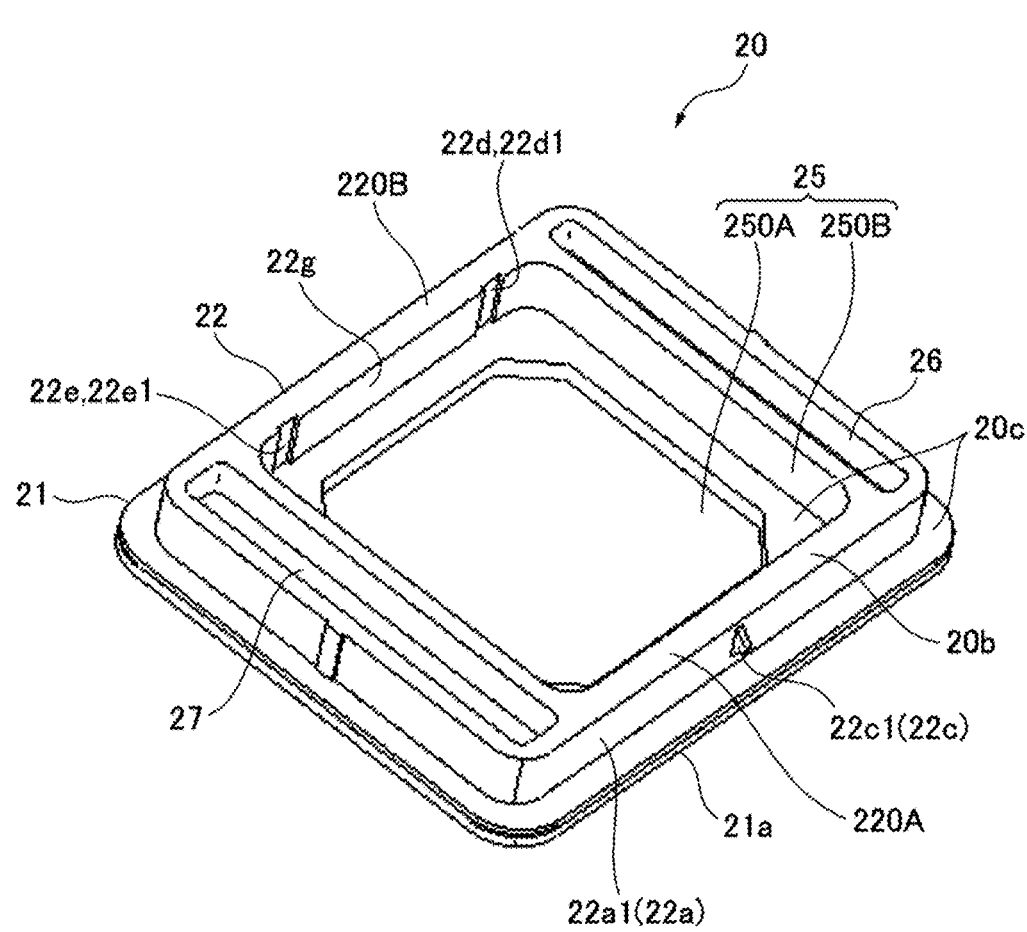
FIG. 13 is a perspective view of the ring member viewed from another direction.
Figure 13:
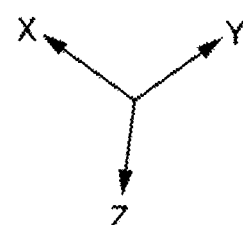

Next, the ring member 20 will be described again. FIG. 11 is a bottom view of the ring member 20, FIG. 12 is a perspective view of the ring member 20 viewed from one direction, FIG. 13 is a perspective view of the ring member 20 viewed from another direction, and FIG. 14 is a cross-sectional view taken along a line B-B in FIG. 11.

The ring member 20 is a planar member and is disposed around the first tubular portion 37 of the lens unit 30. The ring member 20 includes a third surface 20*a* (see FIG. 9) and a fourth surface 20*b* (see FIG. 11 or FIG. 12) opposite to the third surface 20*a* and closer to the circuit board 40 than the third surface 20*a*.

The ring member 20 has a two-layer structure including at least a first layer 21 and a second layer 22 that are laminated. The first layer 21 includes a first-layer end surface 21*a* (see FIG. 12) having a first thickness. The first-layer end surface 21*a* is disposed between the third surface 20*a* and the fourth surface 20*b* and around the first tubular portion 37. The second layer 22 has a smaller area in the plan view than the first layer 21, and includes a second-layer end surface 22*a* (see FIG. 12) having a second thickness. The second-layer end surface 22*a* is disposed between the third surface 20*a* and the fourth surface 20*b* and in at least a part of a periphery of the first tubular portion 37, and is disposed along the first layer 21 and closer to the circuit board 40 than the first layer 21.

Figure 14:
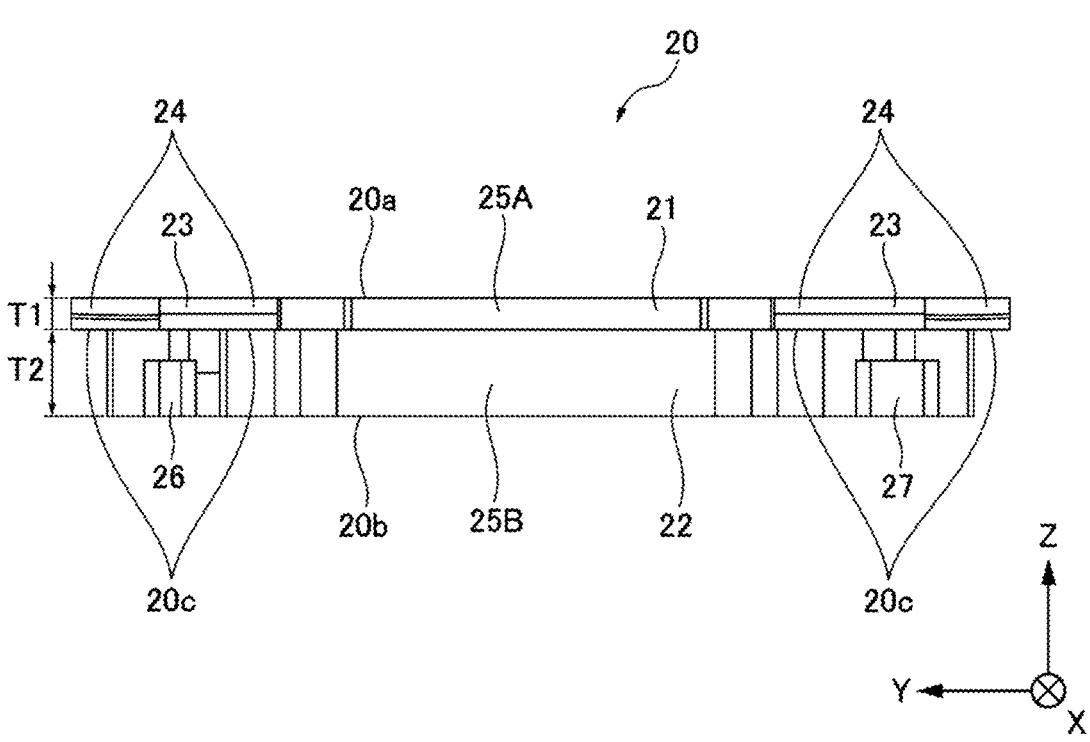
FIG. 14 is a cross-sectional view taken along a line B-B in FIG. 11.

The first layer 21 includes a first region 23 in which the second layer 22 is disposed and a second region 24 in which the second layer 22 is not disposed (see FIG. 14). That is, the first region 23 directly faces the second layer 22, and the second region 24 does not face the second layer 22.

The first layer 21 further includes a fifth surface 20*c* opposite to the third surface 20*a* in the second region 24. The fifth surface 20*c* is fixed to the first flange surface 32*a* of the flange portion 32 of the lens unit 30, and is fixed to the end portion 63 of the large-diameter tubular portion 61 of the housing 60. Further, the second-layer end surface 22*a* of the second layer 22 has at least one second-layer protrusion 22*c* that protrudes toward an inner surface of the large-diameter tubular portion 61 of the housing 60 and abuts on the inner surface of the large-diameter tubular portion 61 of the housing 60.

The ring member 20 is an annular member having an opening 25 in a central portion thereof, the first layer 21 includes a rectangular first opening 250A in the central portion in a plan view, and the second layer 22 includes a rectangular second opening 250B in the central portion in the plan view. The first tubular portion 37 of the lens unit 30 passes through the first opening 250A of the first layer 21 and the second opening 250B of the second layer 22. An area of the first opening 250A of the first layer 21 is smaller than an area of the second opening 250B of the second layer 22, and the area of the first opening 250A of the first layer 21 is smaller than an area of the flange portion 32 of the lens unit 30.

In a general laser welding method in which the ring member 20, the lens unit 30, and the housing 60 are welded by, for example, laser welding, when a laser is emitted to a light-transmitting resin in a state in which a pressure is applied to the resin, the laser is transmitted without being absorbed by the light-transmitting resin and is absorbed by a surface of a light-absorbing resin. The energy of the absorbed laser is converted into heat, and the surface of the light-absorbing resin is heated. Further, a surface of the light-transmitting resin in contact with the surface of the light-absorbing resin is also heated due to heat conduction. Accordingly, the resin is melted at a boundary surface between the light-absorbing resin and the light-transmitting resin. When the laser emission is stopped, the molten resin is solidified and both resins are welded.

In the present embodiment, the laser is emitted in a state in which the fifth surface 20c of the first layer 21 of the ring member 20 is pressed against the first flange surface 32a of the flange portion 32 of the lens unit 30, and the fifth surface 20c of the ring member 20 and the first flange surface 32a of the flange portion 32 are fixed to each other. Thereafter, the laser is emitted in a state in which the fifth surface 20c of the first layer 21 of the ring member 20 is pressed against the end portion 63 of the housing 60, and the fifth surface 20c of the ring member 20 and the end portion 63 are fixed to each other.

According to the vehicular camera 100 of the present embodiment, the ring member 20 disposed around the first tubular portion 37 of the lens unit 30 includes the first layer 21 disposed around the first tubular portion 37 and the second layer 22 disposed closer to the circuit board 40 than the first layer 21. The fifth surface 20c of the first layer 21 is fixed to the first flange surface 32a of the flange portion 32 of the lens unit 30 and the end portion 63 of the large-diameter tubular portion 61 of the housing 60. Further, the second-layer end surface 22a of the second layer 22 has at least one second-layer protrusion 22c that abuts on the inner surface of the large-diameter tubular portion 61 of the housing 60.

The vehicular camera assumes variations of products having various sizes, performances, and the like. In particular, in the circuit board 40, specifications such as performance, size, and shape thereof are changed depending on the products. With the change of the circuit board 40, it is necessary to change a size of the large-diameter tubular portion 61 of the housing 60, and with the change in size of the large-diameter tubular portion 61, it becomes necessary to change a size of the lens unit 30, especially a design of the flange portion 32. However, the lens unit 30 is a precise optical component, and changing the design thereof is not easy and requires effort, cost, time, and the like.

On the other hand, in the vehicular camera 100 according to the present embodiment, the ring member 20, which can be manufactured easily at relatively low cost, has the two-layer structure including the first layer 21 and the second layer 22. With the structure, even if the change in size of the large-diameter tubular portion 61 occurs due to the change of the circuit board 40 for each product of the vehicular camera 100, a gap between the large-diameter tubular portion 61 of the housing 60 and the flange portion 32 of the lens unit 30 can be filled by changing a size of the second layer 22 without changing the lens unit 30. Further, the ring member 20 can be easily fixed to the large-diameter tubular portion 61 of the housing 60 due to the action of the second-layer protrusion 22c of the second layer 22. As a result, even if the size of the large-diameter tubular portion 61 of the housing 60 changes with the change of the circuit board 40, it is possible to prevent the light from entering the housing 60 from the outside due to the design change of the ring member 20 without changing the lens unit 30. Thus, it is possible to increase variations of the vehicular camera while reducing effort, cost, time, and the like.

Details of the ring member 20 will be further described. As shown in FIG. 14, a first thickness T1 (equal to a distance between the third surface 20a and the fifth surface 20c) of the first layer 21 is smaller than a second thickness T2 (equal to a distance between the fifth surface 20c and the fourth surface 20b) of the second layer 22. Accordingly, the second layer 22 can efficiently prevent the light from entering the housing 60 from the outside.

It has already been mentioned that the ring member 20 is formed of the resin material having predetermined light transmittance. Here, regarding the light transmittance of the ring member 20, first light transmittance of the first layer 21 for light with a predetermined wavelength (for example, visible light, infrared light, or the like) can be set to be larger than second light transmittance of the second layer 22 for light with a predetermined wavelength. Accordingly, the first layer 21 can be smoothly fixed to the flange portion 32 of the lens unit 30 and the end portion 63 of the large-diameter tubular portion 61 of the housing 60 by laser welding, and the second layer 22 can efficiently prevent the light from entering the housing 60 from the outside.

The ring member 20 can be manufactured by, for example, welding (laser welding, bonding with an adhesive, or the like) of the separately molded first layer 21 and second layer 22 or by two-color molding of the resin material of the first layer 21 and the resin material of the second layer 22. Accordingly, the ring member 20 can be easily manufactured.

The second layer 22 of the ring member 20 will be described in detail. The second layer 22 has a first rectangle including a first side 220A and a second side 220B facing the first side 220A in the plan view of the ring member 20. The second-layer end surface 22a of the second layer 22 has a first second-layer end surface 22a1 corresponding to the first side 220A and a second second-layer end surface 22a2 corresponding to the second side 220B. At least one second-layer protrusion 22c of the second layer 22 includes a first second-layer protrusion 22c1 disposed on the first second-layer end surface 22a1 of the second layer 22, a second second-layer protrusion 22c2 disposed on the second second-layer end surface 22a2 of the second layer 22, and a third second-layer protrusion 22c3 disposed on the second second-layer end surface 22a2 of the second layer 22.

Accordingly, the second layer 22 can be easily manufactured, and the second layer 22 can be firmly and stably fixed to the large-diameter tubular portion 61 of the housing 60 by the three second-layer protrusions 22c.

The first second-layer protrusion portion 22c1 of the second layer 22 is disposed at a center (a line P-P in FIG. 11) of the first second-layer end surface 22a1 of the second layer 22 (see FIG. 11). The second second-layer protrusion 22c2 is disposed at a position separated by a first distance D1 from a center (the line P-P in FIG. 11) of the second second-layer end surface 22a2 (see FIG. 11). The third second-layer protrusion 22c3 is disposed at a position separated by a second distance D2 from the center (the line P-P in FIG. 11) of the second second-layer end surface 22a2 (see FIG. 11).

Accordingly, the three second-layer protrusions 22c can firmly and stably fix the second layer 22 to the large-diameter tubular portion 61 of the housing 60.

A length of the first distance D1 may be the same as a length of the second distance D2. Accordingly, since the second second-layer protrusion 22c2 and the third second-layer protrusion 22c3 are formed at equal distances from the center of the second second-layer end surface 22a2, the second layer 22 can be stably fixed to the large-diameter tubular portion 61 of the housing 60.

Figure 15:
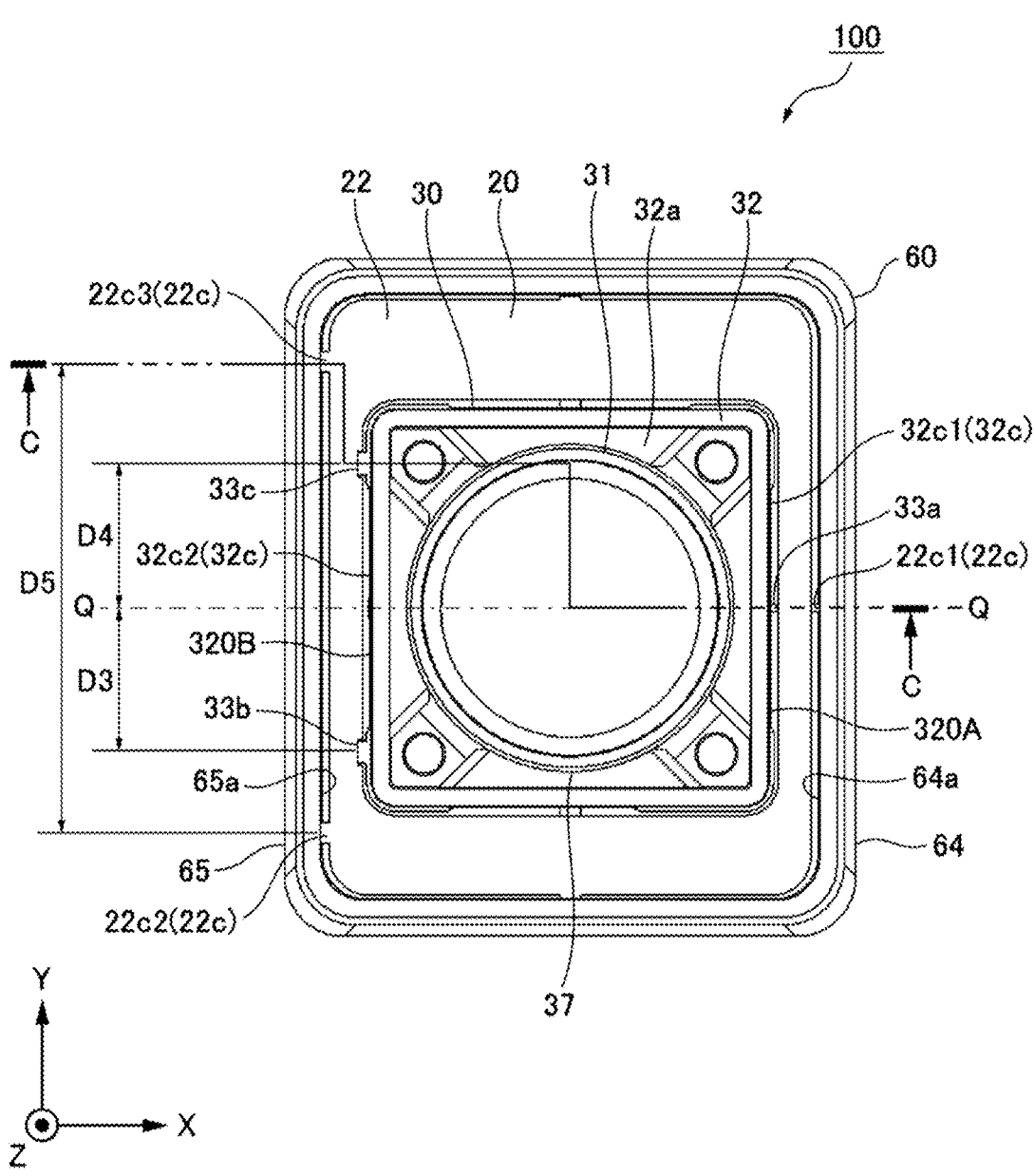
FIG. 15 is a top view of the vehicular camera with only a first layer of the ring member removed.
Figure 16:
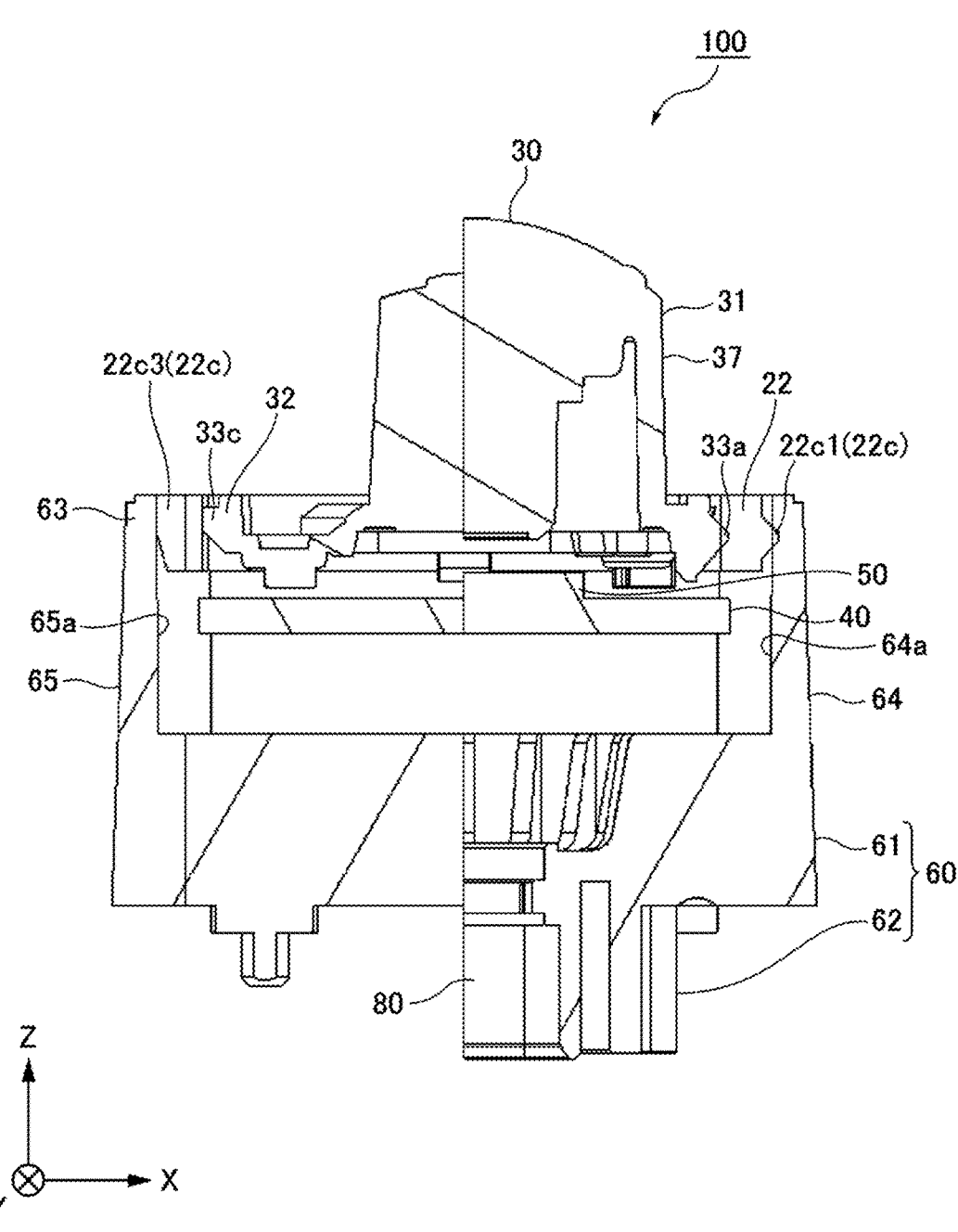
FIG. 16 is a cross-sectional view taken along a line C-C in FIG. 15.

Next, a relationship between the flange portion 32 of the lens unit 30 and the second layer 22 of the ring member 20 will be described in detail. FIG. 15 is a top view of the vehicular camera 100 with only the first layer 21 of the ring member 20 removed for explanation, and FIG. 16 is a cross-sectional view taken along a line C-C in FIG. 15. The flange portion 32 of the lens unit 30 has a second rectangle including a third side 320A and a fourth side 320B facing the third side 320A in a plan view of the flange portion 32. The flange end surface 32c of the flange portion 32 has a first flange end surface 32c1 corresponding to the third side 320A, and has a second flange end surface 32c2 corresponding to the fourth side 320B.

Here, a first flange protrusion 33a is disposed at a center of the first flange end surface 32c1 so as to protrude from the first flange end surface 32c1 toward an inner surface of the second layer 22 of the ring member 20 and come into contact therewith. A second flange protrusion 33b is disposed on the second flange end surface 32c2 and at a position separated by a third distance D3 from a center (a line Q-Q in FIG. 15) of the second flange end surface 32c2. A third flange protrusion 33c is disposed on the second flange end surface 32c2 and at a position separated by a fourth distance D4 from the center (the line Q-Q in FIG. 15) of the second flange end surface 32c2.

Accordingly, the three flange protrusions formed on the flange end surface 32c can firmly and stably fix the flange portion 32 of the lens unit 30 to the inner surface of the second layer 22.

A length of the third distance D3 may be the same as a length of the fourth distance D4. Accordingly, since the second flange protrusion 33b and the third flange protrusion 33c are formed at equal distances from the center of the second flange end surface 32c2, the flange portion 32 of the lens unit 30 can be stably fixed to the inner surface of the second layer 22.

A fifth distance D5 (=the first distance D1+the second distance D2) between the second second-layer protrusion 22c2 and the third second-layer protrusion 22c3 on the second second-layer end surface 22a2 of the second layer 22 of the ring member 20 is larger than a sixth distance (=the third distance D3+the fourth distance D4) between the second flange protrusion 33b and the third flange protrusion 33c on the second flange end surface 32c2 of the flange portion 32.

Accordingly, the two second-layer protrusions 22c are disposed outside the two flange protrusions with reference to the optical axis L, and the distance between the two second-layer protrusions 22c is larger than the distance between the two flange protrusions. Thus, the second layer 22 can be stably fixed to the large-diameter tubular portion 61 of the housing 60, and the flange portion 32 of the lens unit 30 can be stably fixed to the inner surface of the second layer 22.

The inner surface of the second layer 22 further includes at least a first accommodation portion 22d that accommodates the second flange protrusion 33b and a second accommodation portion 22e that accommodates the third flange protrusion 33c. Accordingly, the flange portion 32 of the lens unit 30 can be stably fixed to the inner surface of the second layer 22.

The first accommodation portion 22d includes a first concave portion 22d1 in a direction from the inner surface of the second layer 22 toward the second second-layer end surface 22a2, the second accommodation portion 22e includes a second concave portion 22e1 in the direction from the inner surface of the second layer 22 toward the second second-layer end surface 22a2, and the first concave portion 22d1 and the second concave portion 22e1 are separated by a sixth distance D3+the fourth distance D4). Accordingly, the flange portion 32 of the lens unit 30 can be stably fixed to the inner surface of the second layer 22.

As shown in the figure, the first rectangle of the second layer 22 of the ring member 20 is an oblong, and the first side 22A of the first rectangle and the second side 22B of the first rectangle are long sides of the oblong. However, the "rectangle" includes not only an oblong but also a square shape including other members. Accordingly, the second layer 22 can be easily manufactured.

The second layer 22 has a third concave portion 26 on the fourth surface 20b of the second layer 22 in a direction from the fourth surface 20b toward the third surface 20a. The third concave portion 26 has a part of the second layer 22 as a space instead of a solid. Accordingly, a weight of the ring member 20 can be reduced.

The second layer 22 also has a fourth concave portion 27 different from the third concave portion 26 on the fourth surface 20b of the second layer 22 in the direction from the fourth surface 20b toward the third surface 20a. Similar to the third concave portion 26, the fourth concave portion 27 has a part of the second layer 22 as a space instead of a solid. Accordingly, a weight of the ring member 20 can be reduced.

Next, a relationship between the housing 60, the flange portion 32 of the lens unit 30, and the second layer 22 of the ring member 20 will be described in detail. The large-diameter tubular portion 61 of the housing 60 includes a first side wall portion 64 having a first inner surface 64a and a second side wall portion 65 facing the first side wall portion 64 and having a second inner surface 65a. The inner surface of the second layer 22 of the ring member 20 includes a first second-layer inner surface 22f and a second second-layer inner surface 22g.

The first second-layer protrusion 22c1 of the second layer 22 is in contact with the first inner surface 64a of the first side wall portion 64 of the housing 60, the second second-layer protrusion 22c2 of the second layer 22 is in contact with the second inner surface 65a of the second side wall portion 65 of the housing 60, and the third second-layer protrusion 22c3 of the second layer 22 is in contact with the second inner surface 65a of the second side wall portion 65 of the housing 60. The first flange protrusion 33a of the flange portion 32 is in contact with the first second-layer inner surface 22*f* of the second layer 22, the second flange protrusion 33*b* of the flange portion 32 is in contact with the second second-layer inner surface 22*g* of the second layer 22, and the third flange protrusion 33*c* of the flange portion 32 is in contact with the second second-layer inner surface 22*g* of the second layer 22.

Accordingly, the one second-layer protrusion and the two second-layer protrusions are in contact with each of the two opposing side wall portions of the housing 60, respectively, the one flange protrusion of the flange portion 32 is in contact with the first second-layer inner surface 22*f* of the second layer 22, and the two flange protrusions are in contact with the second second-layer inner surface 22*g* of the second layer 22. Thus, the second layer 22 can be firmly and stably fixed to the large-diameter tubular portion 61 of the housing 60, and the flange portion 32 of the lens unit 30 can be firmly and stably fixed to the inner surface of the second layer 22.

During laser welding, the first flange protrusion 33*a*, the second flange protrusion 33*b*, and the third flange protrusion 33*c* of the flange portion 32 of the lens unit 30 have a function of positioning the second layer 22 of the ring member 20. First, the first tubular portion 37 of the lens unit 30 is passed through the second opening 250B and the first opening 250A in this order from the fourth surface 20*b* side of the ring member 20. Then, the first flange protrusion 33*a* is first pressed against the first second-layer inner surface 22*f* of the second layer 22 while tilting the flange portion 32. In the pressed state, the flange portion 32 is pushed into the second opening 250B such that the second flange protrusion 33*b* is along the first accommodation portion 22*d* (the first concave portion 22*d*1) of the second second-layer inner surface 22*g* of the second layer 22 and the third flange protrusion 33*c* is along the second accommodation portion 22*e* (the second concave portion 22*e*1), centering on the first flange protrusion 33*a*. In the process, the second flange protrusion 33*b* is accommodated in the first accommodation portion 22*d* (the first concave portion 22*d*1) and the third flange protrusion 33*c* is accommodated in the second accommodation portion 22*e* (the second concave portion 22*e*1) while the first flange protrusion 33*a* is crushed. Accordingly, the flange portion 32 of the lens unit 30 is positioned on the inner surface of the second layer 22 of the ring member 20 (first-stage positioning).

Further, during laser welding, the first second-layer protrusion 22*c*1, the second second-layer protrusion 22*c*2, and the third second-layer protrusion 22*c*3 of the second layer 22 of the ring member 20 have a function of positioning the housing 60. After the lens unit 30 and the ring member 20 are welded, first, the first second-layer protrusion 22*c*1 of the second layer 22 of the ring member 20 is pressed against the first inner surface 64*a* of the first side wall portion 64 of the large-diameter tubular portion 61 of the housing 60 while tilting the ring member 20. In the pressed state, the ring member 20 is pushed into the large-diameter tubular portion 61 such that the second second-layer protrusion 22*c*2 and the third second-layer protrusion 22*c*3 of the second layer 22 are along the second inner surface 65*a* of the second side wall portion 65, centering on the first second-layer protrusion 22*c*1. In the process, the second second-layer protrusion 22*c*2 and the third second-layer protrusion 22*c*3 are in contact with and fixed to the second inner surface 65*a* of the second side wall portion 65 while the first second-layer protrusion 22*c*1 is crushed. Accordingly, the ring member 20 is positioned on the first inner surface 64*a* and the second inner surface 65*a* of the large-diameter tubular portion 61 of the housing 60 (second-stage positioning).

Second Embodiment

Figure 17:
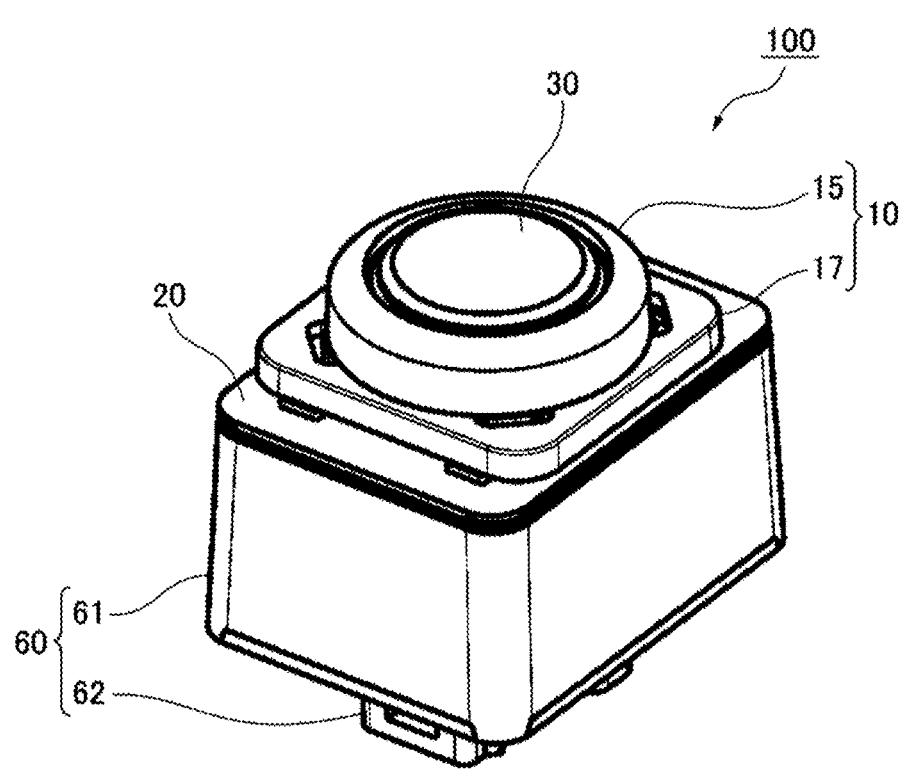
FIG. 17 is a top perspective view of a vehicular camera according to a second embodiment.
Figure 17:
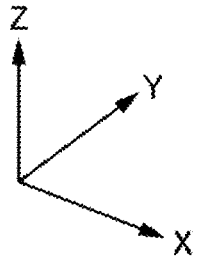
Figure 18:
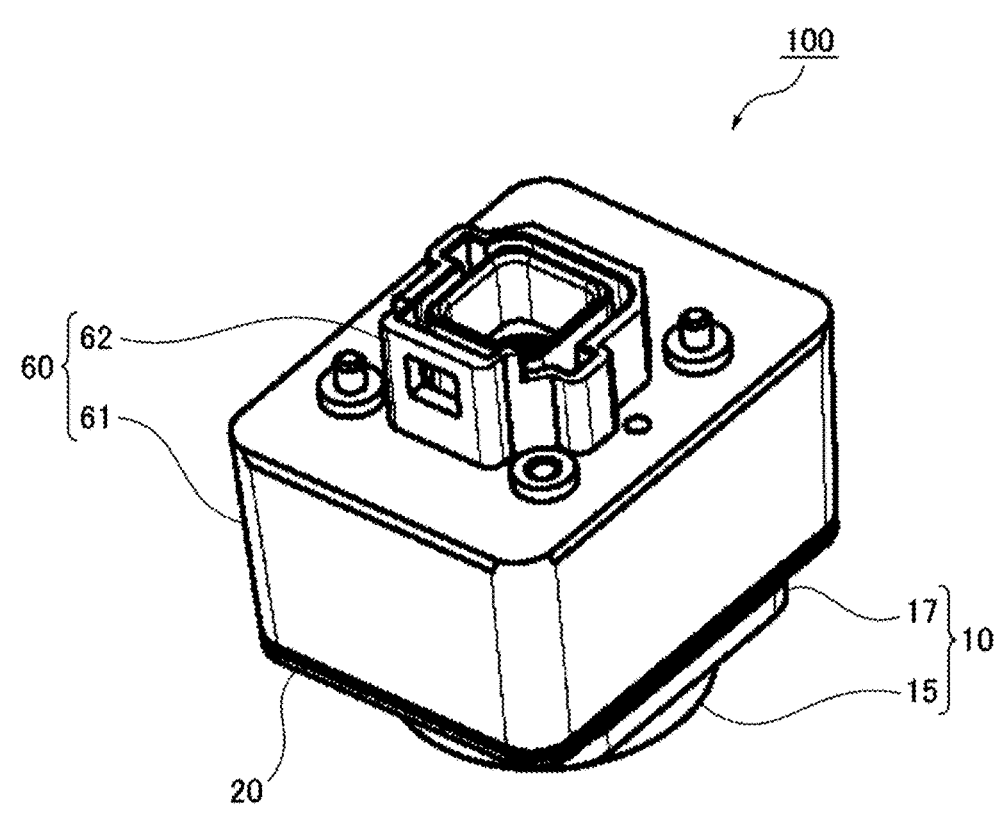
FIG. 18 is a bottom perspective view of the vehicular camera according to the second embodiment.
Figure 18:
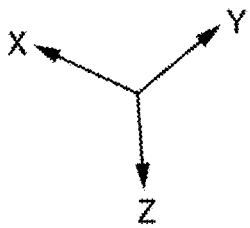
Figure 19:
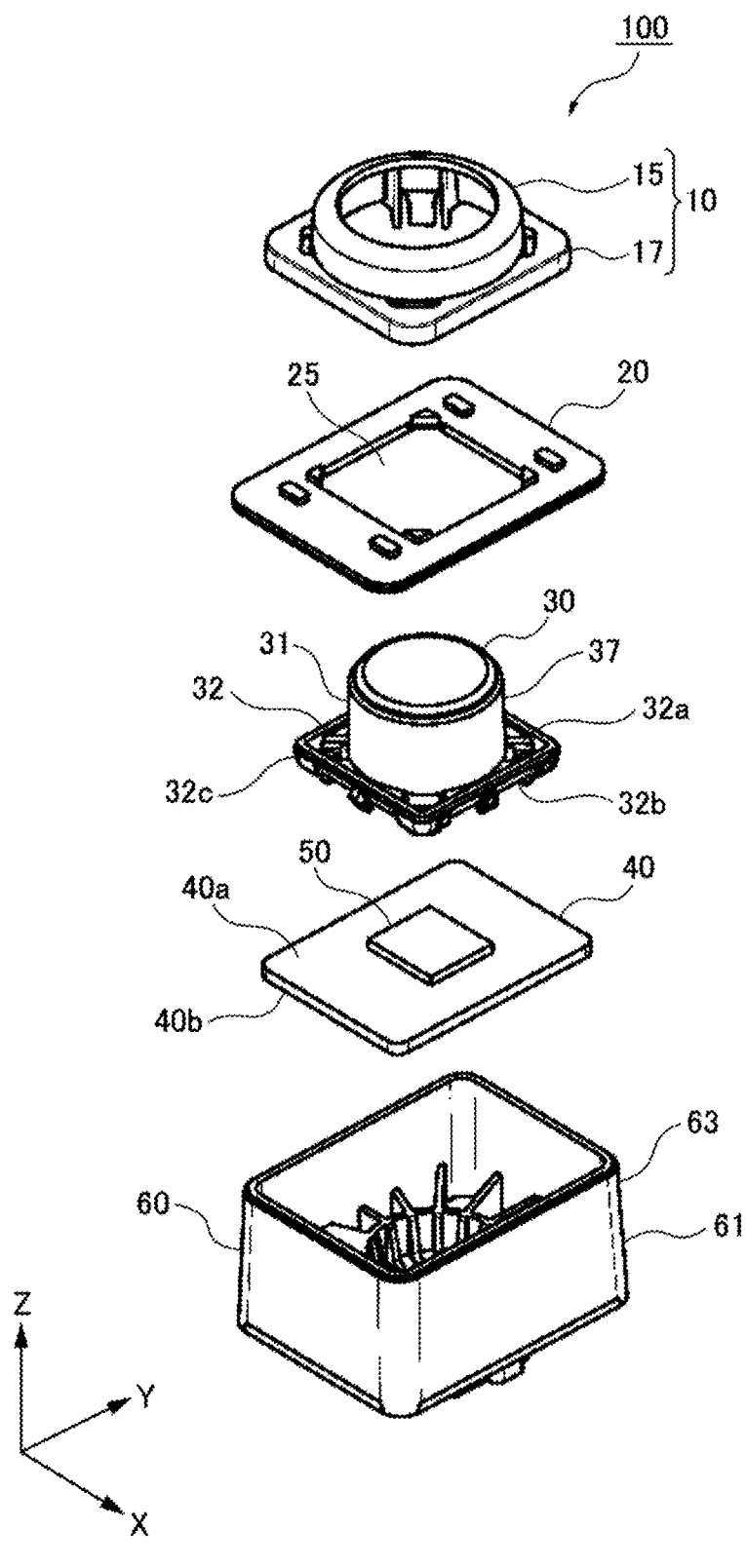
FIG. 19 is an exploded perspective view of the vehicular camera according to the second embodiment.
Figure 20:
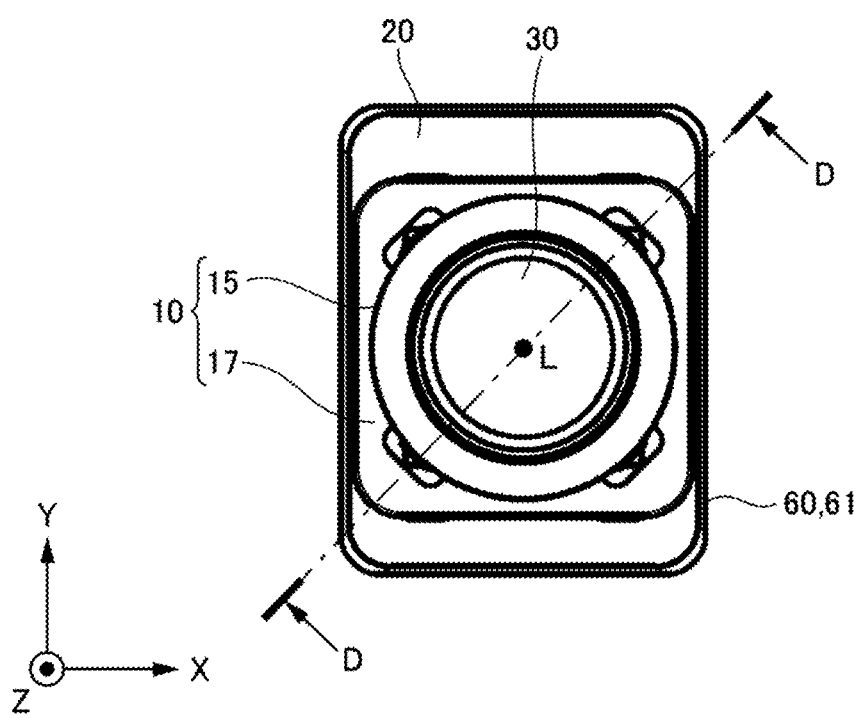
FIG. 20 is a top view of the vehicular camera according to the second embodiment.
Figure 21:
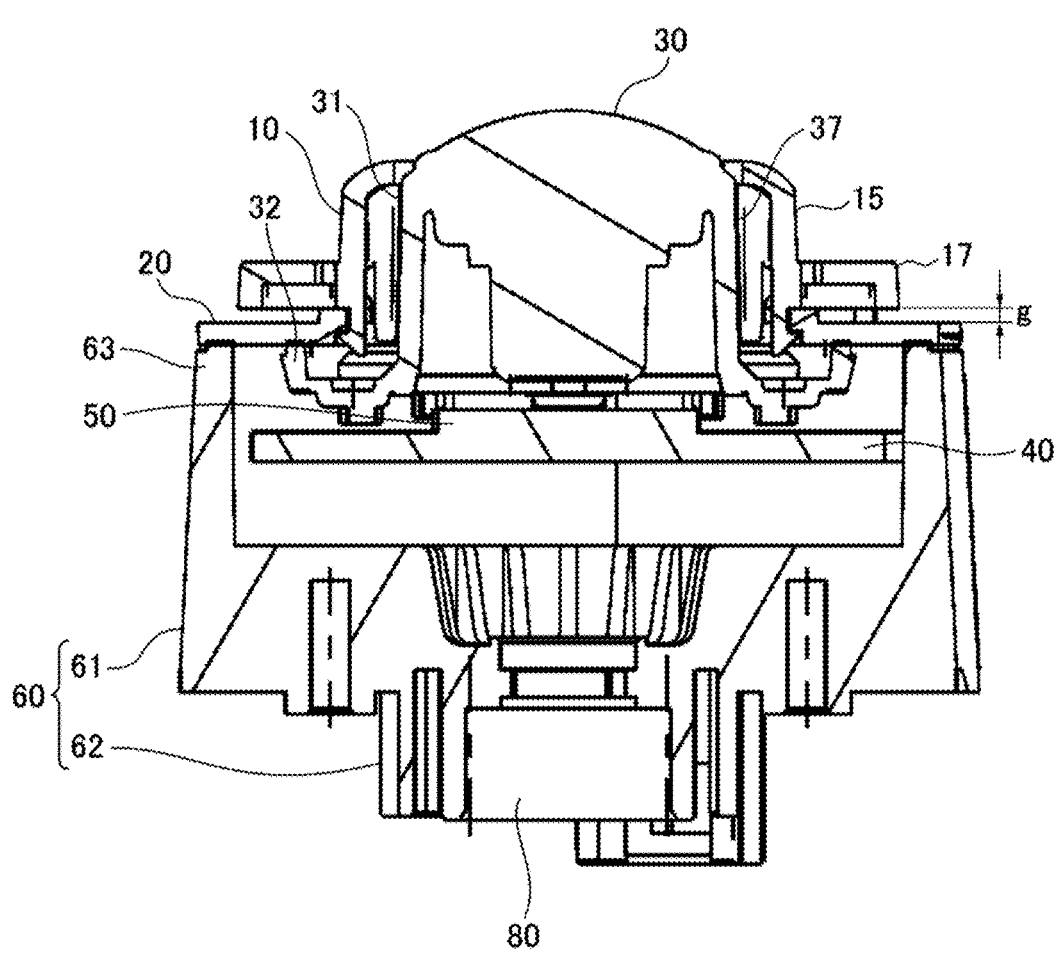
FIG. 21 is a cross-sectional view taken along a line D-D in FIG. 20.

FIG. 17 is a top perspective view of a vehicular camera 100 according to a second embodiment. FIG. 18 is a bottom perspective view of the vehicular camera 100 according to the second embodiment. FIG. 19 is an exploded perspective view of the vehicular camera 100 according to the second embodiment. FIG. 20 is a top view of the vehicular camera 100 according to the second embodiment. FIG. 21 is a cross-sectional view taken along a line D-D in FIG. 20.

The vehicular camera 100 according to the present embodiment includes a cap member 10, a ring member 20 which is a planar member, a lens unit 30, a circuit board 40, an imaging element 50, and a housing 60. The lens unit 30, the circuit board 40, and the imaging element 50 may have substantially the same configuration as those of the first embodiment.

The cap member 10 is provided around a first tubular portion 37 of the lens unit 30, has at least a third tubular portion 15, and serves to protect the lens unit 30. Details of the cap member 10 will be described later.

Similar to the first embodiment, the ring member 20, which is a planar member, is implemented by a rectangular annular member in a plan view, and is welded to the lens unit 30 and the housing 60 by laser welding. However, the ring member 20 is not necessarily an independent member. In the present embodiment, the ring member 20 only needs to function as an end surface portion that covers a part of an end portion 63 of a large-diameter tubular portion 61 of the housing 60, and the ring member 20 and the housing 60 may be supplied as an integrated component. The end surface portion supports the lens unit 30.

Figure 22:
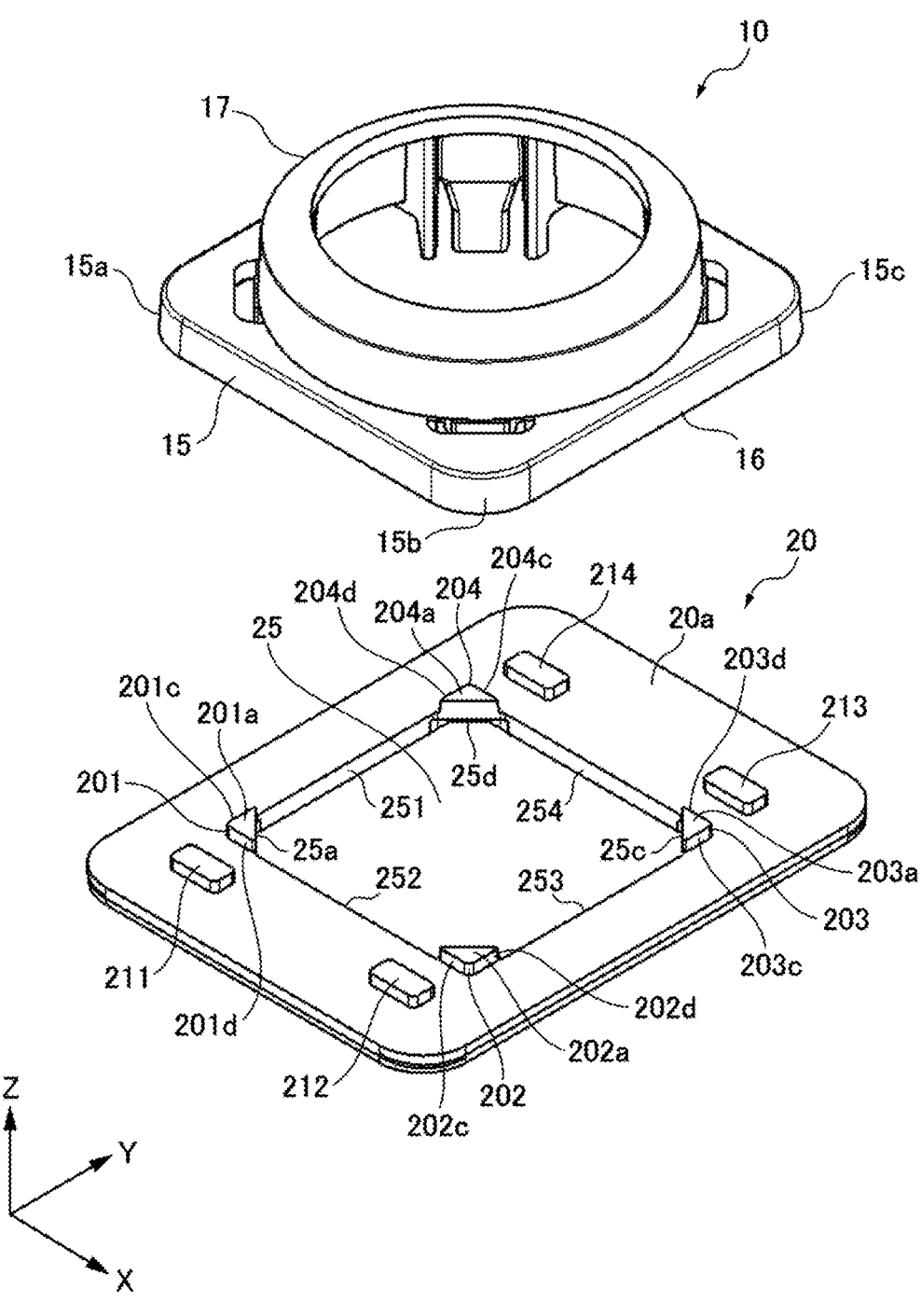
FIG. 22 is a perspective view showing a cap member and a ring member in a separated state.
Figure 23:
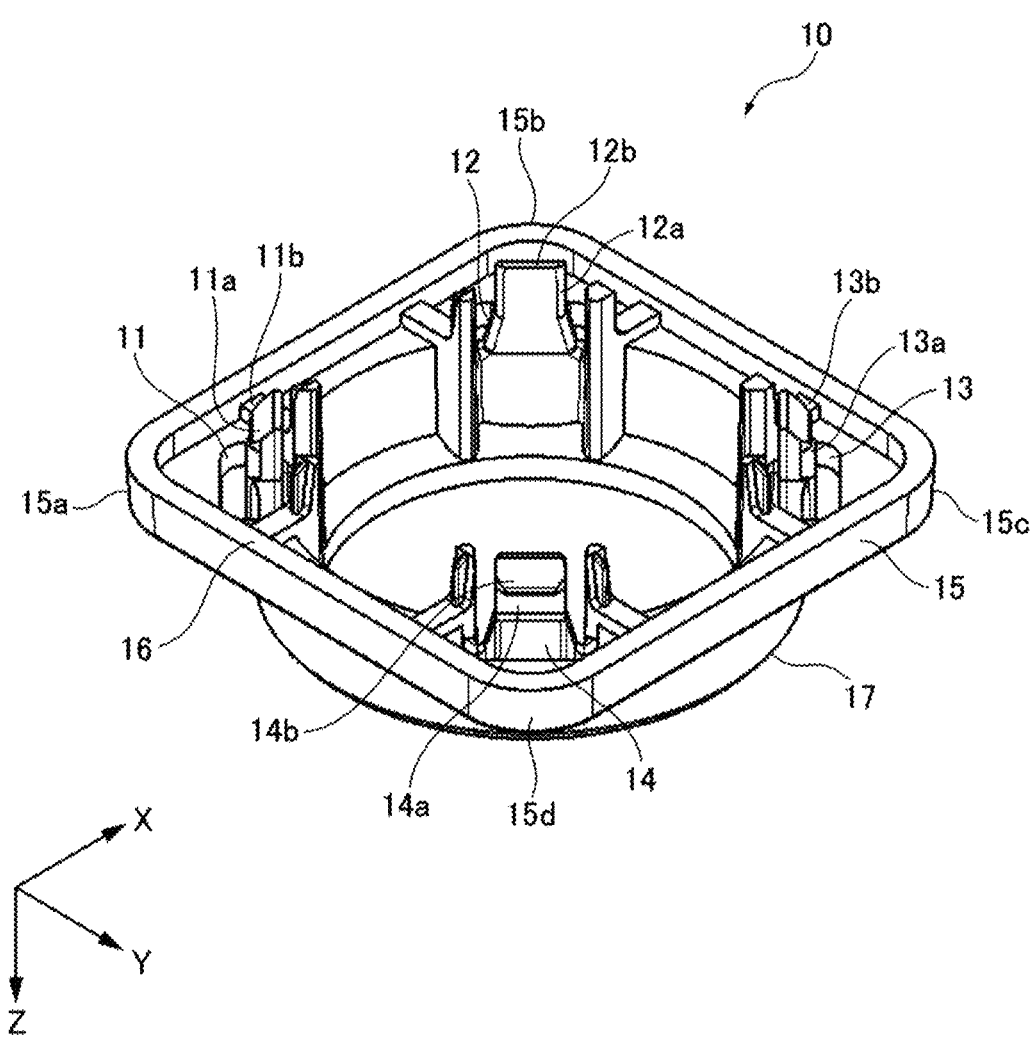
FIG. 23 is a perspective view of the cap member viewed from a back side.
Figure 24:
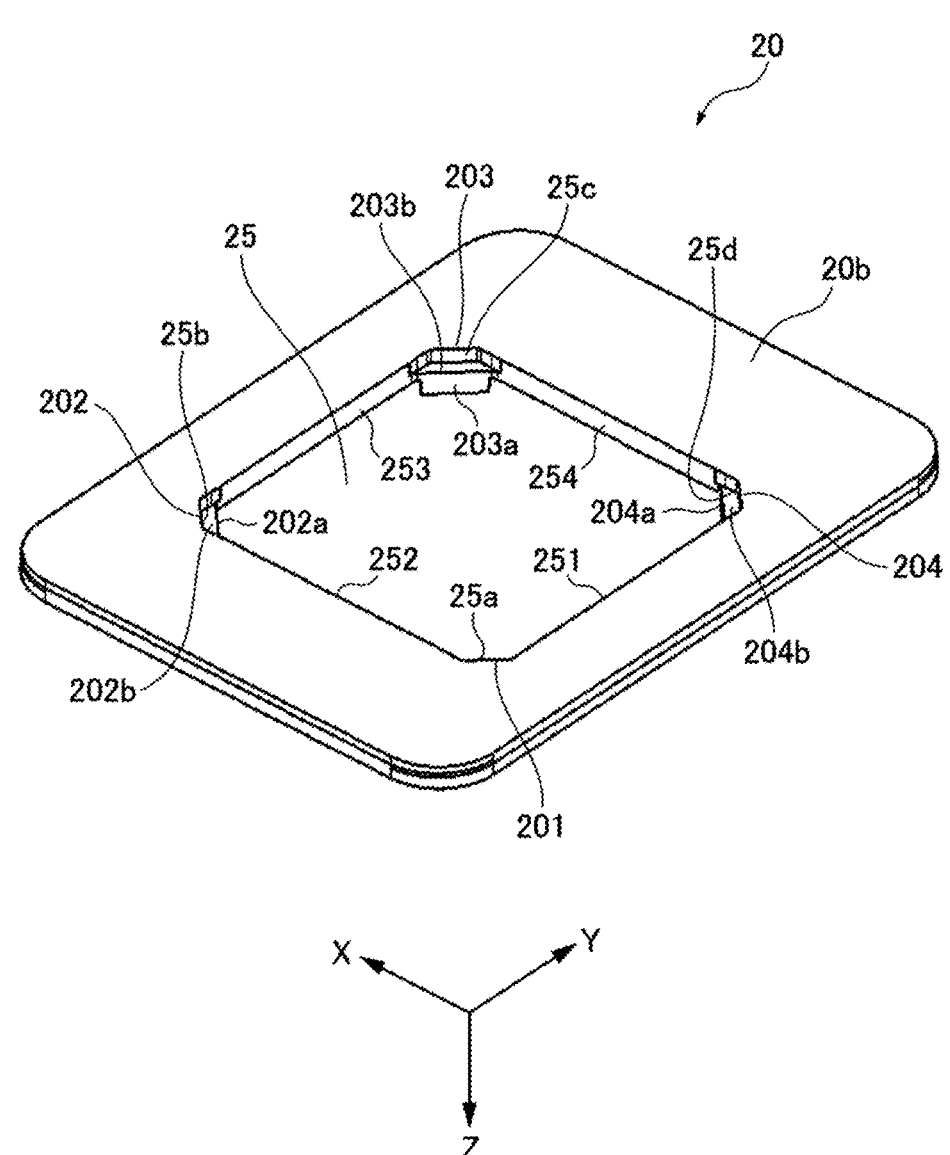
FIG. 24 is a perspective view of a planar member viewed from the back side.

Next, a relationship between the cap member 10 and the ring member 20 will be described. FIG. 22 is a perspective view showing the cap member 10 and the ring member 20 in a separated state. FIG. 23 is a perspective view of the cap member 10 viewed from a back side. FIG. 24 is a perspective view of the ring member 20 viewed from the back side.

The third tubular portion 15 of the cap member 10 includes a cap end portion 16 facing the ring member 20 (an end surface portion of the large-diameter tubular portion 61 of the housing 60), and a first projection 11, a second projection 12, and a third projection 13 that each have a leg shape and project toward an inside of the large-diameter tubular portion 61 of the housing 60 (see FIG. 23). The ring member 20 (the end surface portion) includes a first engaging portion 201 that engages with the first projection 11 of the cap member 10, a second engaging portion 202 that engages with the second projection 12 of the cap member 10, and a third engaging portion 203 that engages with the third projection 13 of the cap member 10 (see FIG. 22). A specific aspect of the engagement will be described later.

Further, in a direction along the optical axis L, the ring member 20 includes a first convex portion 211, a second convex portion 212, and a third convex portion 213 that protrude in a direction away from a first surface 40*a* of the circuit board 40 and abut on at least a part of the cap end portion 16 of the cap member 10 (see FIG. 22).

The vehicular camera assumes variations of products having various sizes, performances, and the like. In particular, in the imaging element 50, the performance thereof is changed depending on the products. With the change of the imaging element 50, it is necessary to change a projection amount of the first tubular portion 37 of the lens unit 30 in a Z-axis direction from the viewpoint of focus adjustment or the like. If the projection amount of the first tubular portion 37 is changed, it is necessary to change the design of the cap member 10, but from the viewpoint of reducing cost, effort, and the like, it is desirable to use a common cap member 10 for a plurality of products.

In the vehicular camera 100 according to the present embodiment, the end surface portion of the large-diameter tubular portion 61 of the housing 60, that is, the ring member 20 includes the first engaging portion 201, the second engaging portion 202, and the third engaging portion 203 that respectively engage with the first projection 11, the second projection 12, and the third projection 13 of the cap member 10. Further, the ring member 20 includes the first convex portion 211, the second convex portion 212, and the third convex portion 213 that abut on at least a part of the cap end portion 16 of the cap member 10. With the structure, even when the projection amount of the first tubular portion 37 is changed due to the change of the imaging element 50 for each product of the vehicular camera 100, a position of the cap member 10 in the Z-axis direction can be adjusted by changing the ring member 20 without changing the cap member 10. In particular, by changing projection amounts of the first convex portion 211, the second convex portion 212, and the third convex portion 213 of the ring member 20 in the Z-axis direction, the position of the cap member 10 in the Z-axis direction can be adjusted, and the cap member 10 and the ring member 20 can be engaged with each other while aligning with the first tubular portion 37. Thus, the cost, effort, and the like necessary for changing the design of the cap member 10 can be reduced.

As shown in FIG. 21, according to the present embodiment, a gap g is generated between the cap end portion 16 and the ring member 20 in the Z-axis direction, which may cause a problem in appearance, but there is no problem if the structure is covered by the vehicle body. In particular, as in the vehicular camera 100C and the vehicular camera 100D of FIG. 1, when the camera is installed on the side mirror of the vehicle V, the portion of the cap member 10 is hidden by the side mirror, and thus there is no problem.

In addition, in a manufacturing process of the vehicular camera 100, it is difficult to determine a difference in the projection amount of the first tubular portion 37 for each product and attach different types of cap members 10. This is because the difference in projection amount is slight. According to the present embodiment, the first convex portion 211, the second convex portion 212, and the third convex portion 213 of the ring member 20 are changed for each product in advance, and the same cap member 10 is attached at an appropriate position, and thus it is also possible to eliminate the complexity of attaching different cap members 10 for products.

In the embodiment, the end surface portion of the housing 60 includes the ring member 20 which is a flat plate-shaped planar member fixed to the end portion 63 of the large-diameter tubular portion 61. Accordingly, it is possible to more easily manufacture the end surface portion of the housing 60 using a flat plate-shaped planar member. The housing 60 and the ring member 20 are fixed by, for example, laser welding, but may also be fixed with an adhesive.

The ring member 20 includes a third surface 20a and a fourth surface 20b opposite to the third surface 20a, and may be welded over an entire circumference by the fourth surface 20b and the end portion 63 of the large-diameter tubular portion 61 of the housing 60. Accordingly, the end portion 63 of the housing 60 and the ring member 20 can be firmly fixed.

An outer shape of the third tubular portion of the cap member 10 has a first rectangle including a first corner 15a, a second corner 15b, a third corner 15c, and a fourth corner 15d in a plan view. The ring member 20 has an opening 25 through which the first tubular portion 37 of the lens unit 30 passes. The opening 25 of the ring member 20 has a second rectangle including a fifth corner 25a, a sixth corner 25b, a seventh corner 25c, and an eighth corner 25d in a plan view.

The first projection 11 of the cap member 10 is formed corresponding to the first corner 15a of the first rectangle, the second projection 12 of the cap member 10 is formed corresponding to the second corner 15b of the first rectangle, and the third projection 13 of the cap member 10 is formed corresponding to the third corner 15c of the first rectangle. A fourth projection 14 further included in the cap member 10 is formed corresponding to the fourth corner 15d of the first rectangle.

The first engaging portion 201 of the ring member 20 is formed corresponding to the fifth corner 25a of the second rectangle, the second engaging portion 202 of the ring member 20 is formed corresponding to the sixth corner 25b of the second rectangle, and the third engaging portion 203 of the ring member 20 is formed corresponding to the seventh corner 25c of the second rectangle. A fourth engaging portion 204 further included in the ring member 20 is formed corresponding to the eighth corner 25d of the second rectangle.

Accordingly, it is possible to easily manufacture the third tubular portion 15 of the cap member 10 and the opening 25 of the ring member 20, and it is possible to easily form four projections of the cap member 10 and four engaging portions of the ring member 20.

Figure 25:
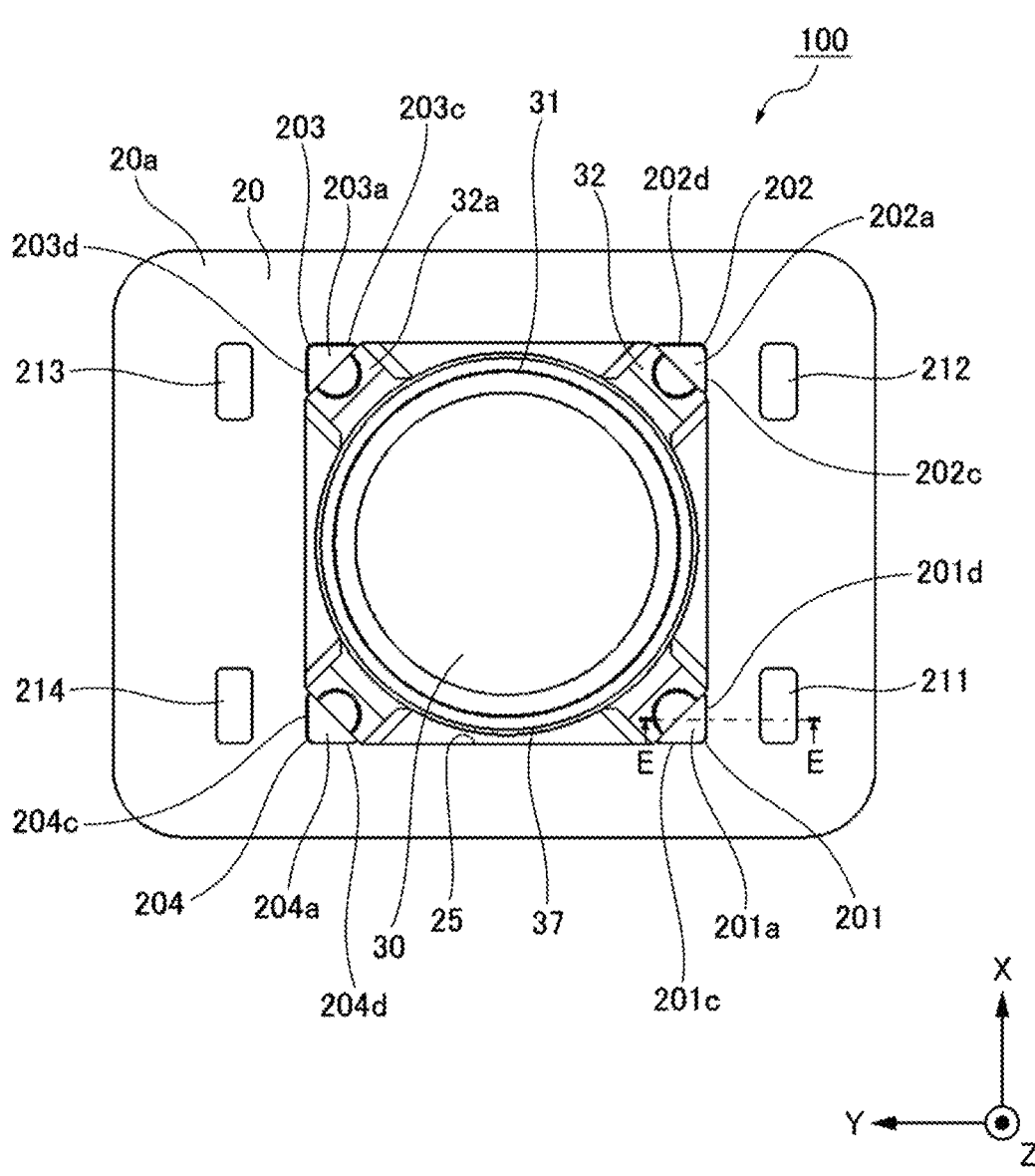
FIG. 25 is a top view of the vehicular camera with the cap member removed.
Figure 26:
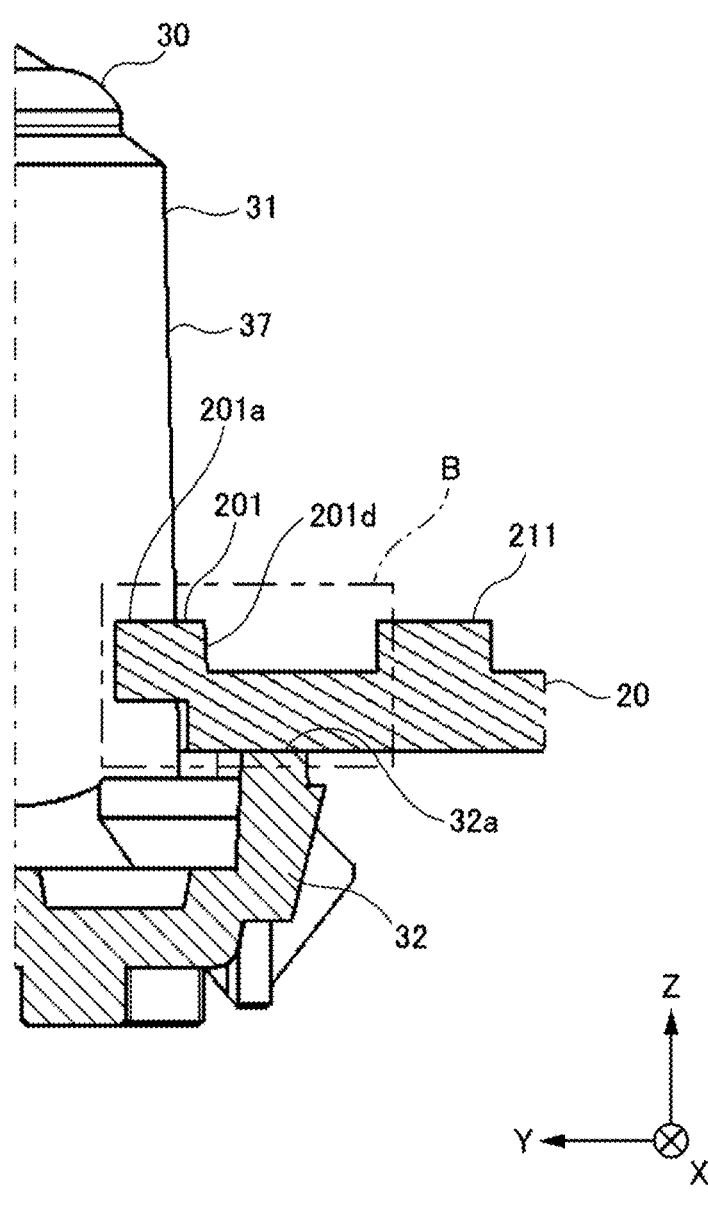
FIG. 26 is a cross-sectional view taken along a line E-E in FIG. 25.
Figure 27:
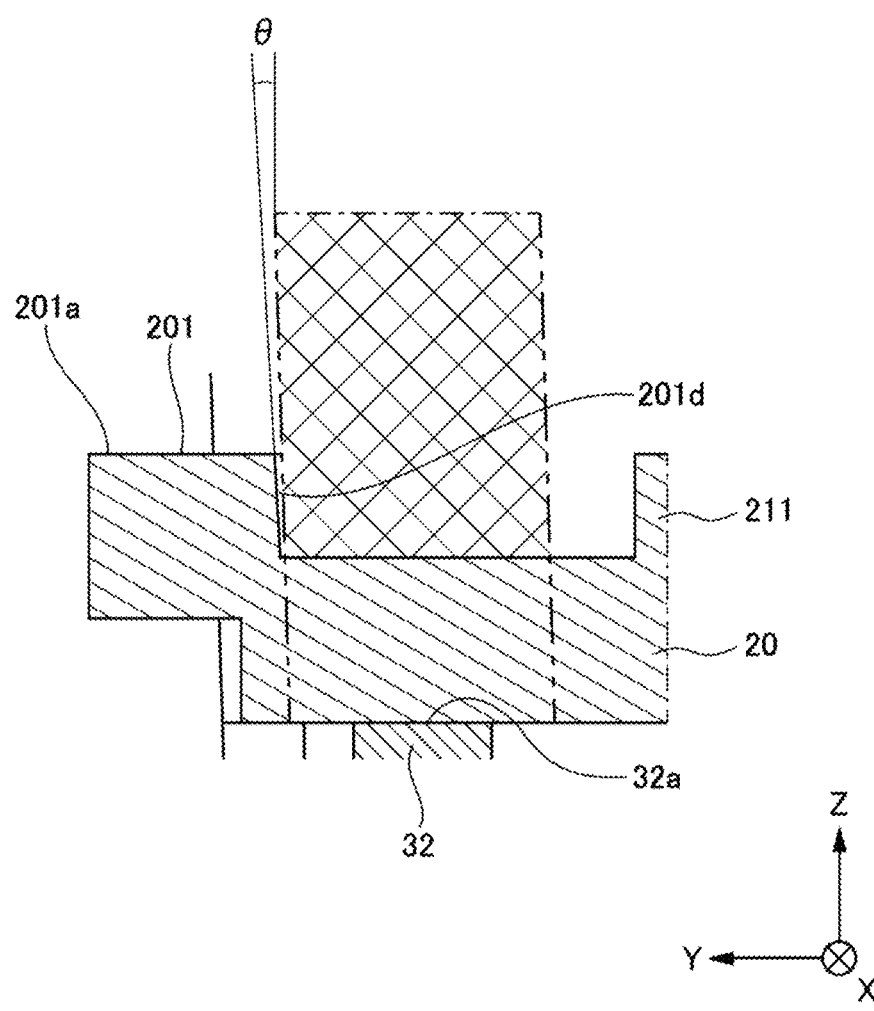
FIG. 27 is an enlarged view of a region B in FIG. 26.

Next, a relationship between the projections of the cap member and the ring member 20 will be described. FIG. 25 is a top view of the vehicular camera 100 with the cap member 10 removed. FIG. 26 is a cross-sectional view taken along a line E-E in FIG. 25. FIG. 27 is an enlarged view of a region B in FIG. 26.

As shown in FIG. 22, the second rectangle of the opening 25 of the ring member 20 includes a first side 251, a second side 252 intersecting the first side 251, a third side 253 intersecting the second side 252, and a fourth side 254 intersecting the third side 253. As shown in FIG. 23, the first projection 11 of the cap member 10 includes a first leg portion 11a extending from the third tubular portion 15 of the cap member 10 so as to pass through the opening 25 of the ring member 20, and a first claw portion 11b extending from a tip portion of the first leg portion 11a.

As shown in FIGS. 22, 26, and 27, the first engaging portion 201 of the ring member 20 includes a first standing ridge 201a standing from the third surface 20a of the ring member 20 toward the cap end portion 16 of the cap member 10 at the fifth corner 25a of the second rectangle of the opening 25 of the ring member 20.

The first standing ridge 201a of the ring member 20 includes a first engaging surface 201b (see FIG. 30) that faces the opening 25 of the ring member 20 and engages with the first claw portion 11b of the cap member 10, a first standing surface 201c standing from the first side 251 in the second rectangle of the opening 25 of the ring member 20, and a second standing surface 201d standing from the second side 252 in the second rectangle of the opening 25 of the ring member 20. As indicated by an inclination angle θ in FIG. 27, the first standing surface 201c and the second standing surface 201*d* of the first standing ridge 201*a* of the ring member 20 are inclined toward a center of the plan view of the ring member 20 in the direction along the optical axis L.

Accordingly, the first claw portion 11*b* of the first projection 11 of the cap member 10 and the first engaging surface 201*b* of the first standing ridge 201*a* of the first engaging portion 201 are firmly and stably engaged with each other. As shown in FIG. 27, during the laser welding of the flange portion 32 of the lens unit 30 and the ring member 20, the laser for welding is emitted to a position between the first standing ridge 201*a* and the first convex portion 211 from above along the Z-axis direction. If the first standing ridge 201*a* is present at a position through which a laser for welding passes, the welding may be hindered. However, since the first standing surface 201*c* and the second standing surface 201*d* closest to the laser for welding are inclined toward the center of the plan view of the ring member 20 in the direction along the optical axis L, the laser for welding reaches the ring member 20 and the flange portion 32 without coming into contact with the first standing ridge 201*a*. Thus, the laser welding of the flange portion 32 and the ring member 20 can be performed smoothly.

The above description relates to a relationship between the first projection 11 of the cap member 10 and the first standing ridge 201*a* of the ring member 20. However, the other three projections and the other three standing ridges also have similar configurations and effects.

That is, the second projection 12 of the cap member 10 includes a second leg portion 12*a* extending from the third tubular portion 15 of the cap member 10 so as to pass through the opening 25 of the ring member 20, and a second claw portion 12*b* extending from a tip portion of the second leg portion 12*a*. The third projection 13 of the cap member 10 includes a third leg portion 13*a* extending from the third tubular portion 15 of the cap member 10 so as to pass through the opening 25 of the ring member 20, and a third claw portion 13*b* extending from a tip portion of the third leg portion 13*a*. The fourth projection 14 of the cap member 10 includes a fourth leg portion 14*a* extending from the third tubular portion 15 of the cap member 10 so as to pass through the opening 25 of the ring member 20, and a fourth claw portion 14*b* extending from a tip portion of the fourth leg portion 14*a*.

The second engaging portion 202 of the ring member 20 includes a second standing ridge 202*a* standing from the third surface 20*a* of the ring member 20 toward the cap end portion 16 of the cap member 10 at the sixth corner 25*b* of the second rectangle of the opening 25 of the ring member 20. The third engaging portion 203 of the ring member 20 includes a third standing ridge 203*a* standing from the third surface 20*a* of the ring member 20 toward the cap end portion 16 of the cap member 10 at the seventh corner 25*c* of the second rectangle of the opening 25 of the ring member 20. The fourth engaging portion 204 of the ring member 20 includes a fourth standing ridge 204*a* standing from the third surface 20*a* of the ring member 20 toward the cap end portion 16 of the cap member 10 at the eighth corner of the second rectangle of the opening 25 of the ring member 20.

The second standing ridge 202*a* of the ring member 20 includes a second engaging surface 202*b* that faces the opening 25 of the ring member 20 and engages with the second claw portion 12*b* of the cap member 10, a third standing surface 202*c* standing from the second side 252 in the second rectangle of the opening 25 of the ring member 20, and a fourth standing surface 202*d* standing from the third side 253 in the second rectangle of the opening 25 of the ring member 20. The third standing ridge 203*a* of the ring member 20 includes a third engaging surface 203*b* that faces the opening 25 of the ring member 20 and engages with the third claw portion 13*b* of the cap member 10, a fifth standing surface 203*c* standing from the third side 253 in the second rectangle of the opening 25 of the ring member 20, and a sixth standing surface 203*d* standing from the fourth side in the second rectangle of the opening 25 of the ring member 20. The fourth standing ridge 204*a* of the ring member 20 includes a fourth engaging surface 204*b* that faces the opening 25 of the ring member 20 and engages with the fourth claw portion 14*b* of the cap member 10, a seventh standing surface 204*c* standing from the fourth side 254 in the second rectangle of the opening 25 of the ring member 20, and an eighth standing surface 204*d* standing from the first side 251 in the second rectangle of the opening 25 of the ring member 20.

As in FIG. 27, the third standing surface 202*c* and the fourth standing surface 202*d* of the second standing ridge 202*a* of the ring member 20 are inclined toward the center of the plan view of the ring member 20 in the direction along the optical axis L. The fifth standing surface 203*c* and the sixth standing surface 203*d* of the third standing ridge 203*a* of the ring member 20 are inclined toward the center of the plan view of the ring member 20 in the direction along the optical axis. The seventh standing surface 204*c* and the eighth standing surface 204*d* of the fourth standing ridge 204*a* of the ring member 20 are inclined toward the center of the plan view of the ring member 20 in the direction along the optical axis L.

Figure 28:
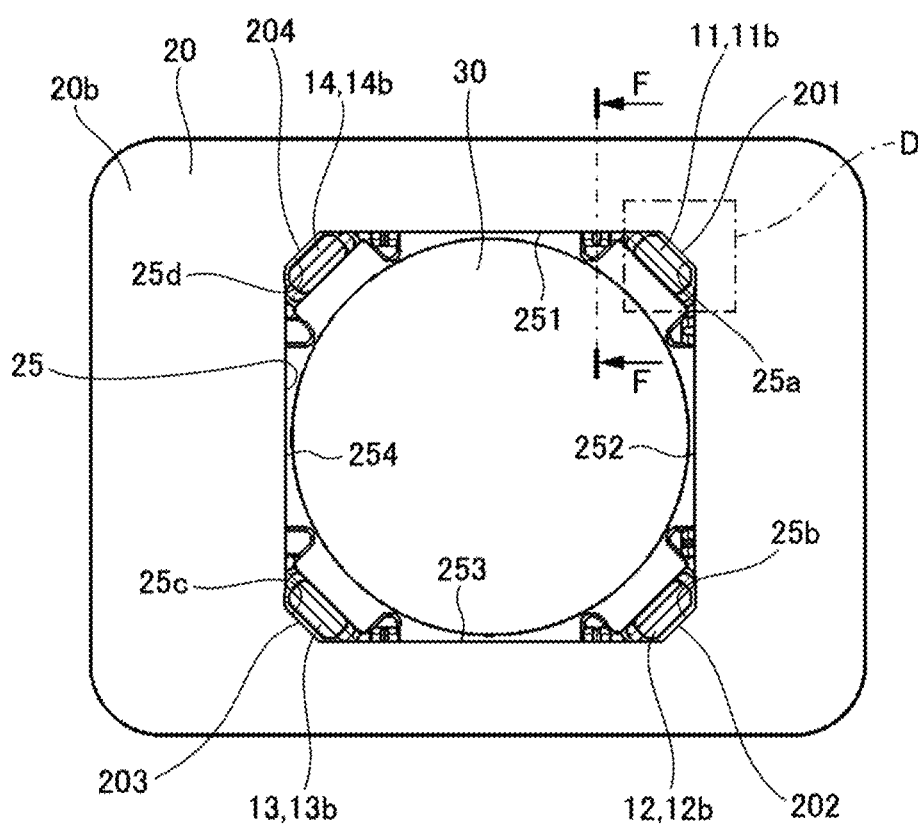
FIG. 28 is a bottom view of the cap member and the planar member as viewed from the back side.
Figure 28:
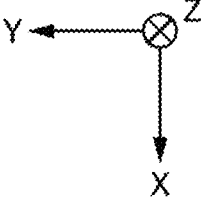
Figure 29:
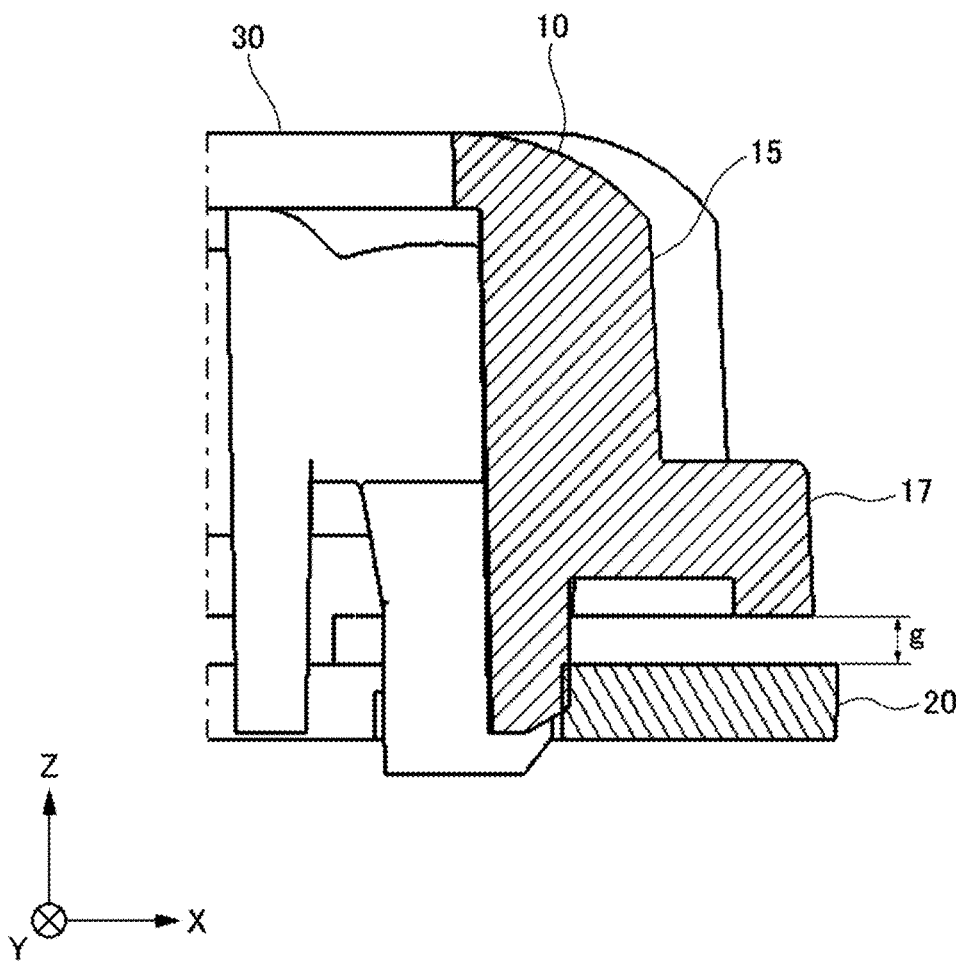
FIG. 29 is a cross-sectional view taken along a line F-F in FIG. 28.
Figure 30:
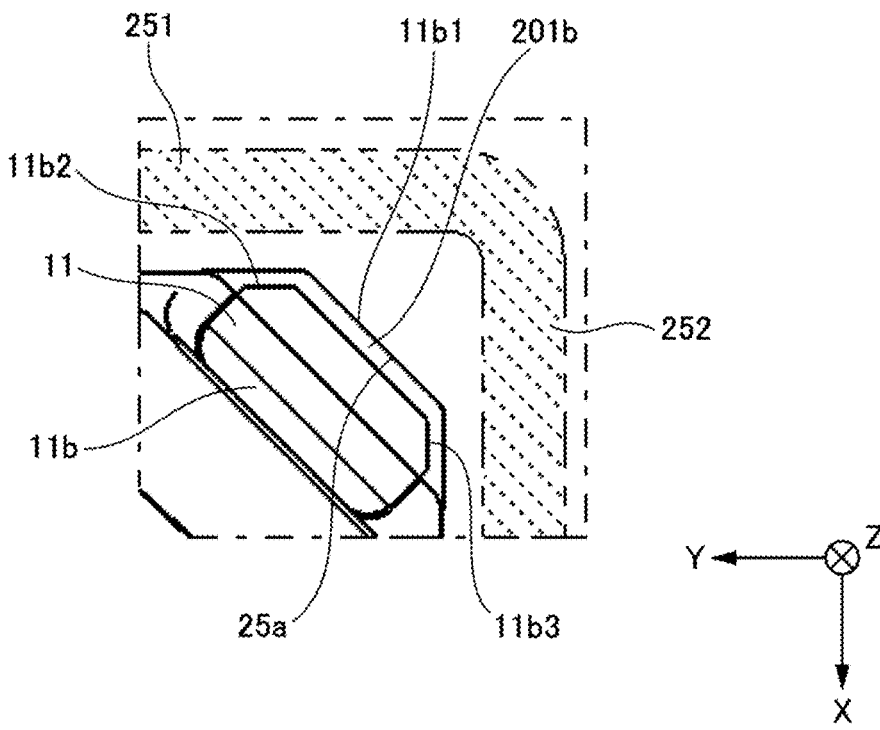
FIG. 30 is an enlarged view of a region D in FIG. 28.

Next, the claw portions of the cap member will be described in detail. FIG. 28 is a bottom view of the cap member 10 and the ring member 20 as viewed from the back side. FIG. 29 is a cross-sectional view taken along a line F-F in FIG. 28. FIG. 30 is an enlarged view of a region D in FIG. 28.

The first claw portion 11*b* of the cap member 10 includes a first edge 11*b*1 facing the first side 251 of the second rectangle of the opening 25 of the ring member 20, a second edge 11*b*2 facing the second side 252 of the second rectangle of the opening 25 of the ring member 20, and a third edge 11*b*3 connecting the first edge 11*b*1 and the second edge 11*b*2. The first edge 11*b*1, the second edge 11*b*2, and the third edge 11*b*3 are disposed on the first engaging surface 201*b* of the first standing ridge 201*a* of the ring member 20. The first edge 11*b*1 and the second edge 11*b*2 of the first claw portion 11*b* are chamfered and separated from the first side 251 and the second side 252, respectively.

Accordingly, the two edges facing the sides of the opening 25 are chamfered in the first claw portion 11*b*, and the first claw portion 11*b* can smoothly engage with the first engaging surface 201*b* of the first standing ridge 201*a*. The second claw portion 12*b*, the third claw portion 13*b*, and the fourth claw portion 14*b* may be chamfered in the same manner as the first claw portion 11*b*.

The first convex portion 211 of the ring member 20 abuts on the cap end portion 16 corresponding to the first corner 15*a* of the first rectangle of the third tubular portion 15 of the cap member 10. The second convex portion 212 of the ring member 20 abuts on the cap end portion 16 corresponding to the second corner 15*b* of the first rectangle of the third tubular portion 15 of the cap member 10. The third convex portion 213 of the ring member 20 abuts on the cap end portion 16 corresponding to the third corner 15*c* of the first rectangle of the third tubular portion 15 of the cap member 10.

Accordingly, since at least three convex portions of the ring member 20 abut on the cap end portion 16 of the cap member 10, the cap member 10 can be stably disposed on the ring member 20.

As described in the first embodiment, the lens unit 30 includes the flange portion 32 that is disposed outside the first tubular portion 37 so as to extend outward with reference to the optical axis L of at least one lens over the entire periphery around the optical axis. Since the flange portion 32 is provided, the lens unit 30 can be supported by the ring member 20, that is, the end portion 63 of the large-diameter tubular portion 61 of the housing 60. In a case where the end surface portion is the ring member 20 separate from housing 60, the lens unit 30 and the ring member 20 may be provided as an integrated component.

The flange portion 32 of the lens unit 30 has a first flange surface 32a, a second flange surface 32b opposite to the first flange surface 32a and facing the first surface 40a of the circuit board 40, and a flange end surface 32c connecting the first flange surface 32a and the second flange surface 32b. The fourth surface 20b of the ring member 20 is fixed to the first flange surface 32a of the flange portion 32 of the lens unit 30. Accordingly, the lens unit 30 can be supported by the end portion 63 of the large-diameter tubular portion 61 of the housing 60 via the ring member 20.

As is clear from the laser welding of FIG. 27 described above, in the cross-sectional view of the ring member 20 and the flange portion 32 of the lens unit 30 in the direction along the optical axis L, the first flange surface 32a of the flange portion 32 of the lens unit 30 is welded to the fourth surface 20b of the ring member 20 between the first standing ridge 201a of the ring member 20 and the first convex portion 211. Accordingly, during the laser welding of the ring member 20 and the flange portion 32, the first standing ridge 201a and the first convex portion 211 can be prevented from interfering with the irradiation of the laser for welding.

Further, the cap member 10 includes a fourth tubular portion 17 that has a second cross section orthogonal to the optical axis L of the third tubular portion 15 having a smaller cross-sectional area than a first cross section and is continuously formed with the third tubular portion 15. Accordingly, the fourth tubular portion 17 of the cap member 10 can be disposed around the first tubular portion 37 of the lens unit 30, and the first tubular portion 37 can be protected.

In the direction along the optical axis L, the ring member 20 further includes a fourth convex portion 214 that protrudes in the direction away from the first surface 40a of the circuit board 40 and abuts on at least a part of the cap end portion 16 of the cap member 10. The first convex portion 211, the second convex portion 212, the third convex portion 213, and the fourth convex portion 214 of the ring member 20 are, for example, polygonal, and the second cross section of the cap member 10 orthogonal to the optical axis Lis, for example, circular.

Accordingly, since the four convex portions of the ring member 20 abut on the cap end portion 16 of the cap member 10, the cap member 10 can be stably disposed on the ring member 20. Since the fourth tubular portion 17 has a circular cross section, the fourth tubular portion 17 fits around the first tubular portion 37 having a tubular shape, and can appropriately protect the first tubular portion 37. The polygon of the first convex portion 211, the second convex portion 212, the third convex portion 213, and the fourth convex portion 214 may be, for example, an octagon as shown, but is not particularly limited.

The first projection 11, the second projection 12, the third projection 13, and the fourth projection 14 of the cap member 10 have a snap-fit shape. Accordingly, the first projection 11, the second projection 12, the third projection 13, and the fourth projection 14 have elasticity, and the cap member 10 can be easily removed from the ring member 20.

From the above, at least the following matters are described in the present disclosure. Components corresponding to those in the embodiment are shown in parentheses, but the present disclosure is not limited thereto.

(A1) A vehicular camera including:

a lens unit (lens unit 30) including a first tubular portion (first tubular portion 37) having a first tubular shape, at least one lens disposed inside the first tubular portion, and a flange portion (flange portion 32) disposed outside the first tubular portion so as to extend outward with reference to an optical axis (optical axis L) of the at least one lens over an entire periphery of the optical axis;

a circuit board (circuit board 40) including a first surface (first surface 40a) and a second surface (second surface 40b) opposite to the first surface;

an imaging element (imaging element 50) disposed on the optical axis of the lens and on the first surface of the circuit board;

a housing (housing 60) having a second tubular portion (large-diameter tubular portion 61) having a second tubular shape along the optical axis and configured to accommodate at least the circuit board and the imaging element inside the second tubular portion; and a planar member (ring member 20) disposed around the first tubular portion of the lens unit and having a third surface (third surface 20a) and a fourth surface (fourth surface 20b) opposite to the third surface and closer to the circuit board than the third surface, in which the flange portion of the lens unit includes a first flange surface (first flange surface 32a), a second flange surface (second flange surface 32b) opposite to the first flange surface and located in an internal space of the second tubular portion of the housing, and a flange end surface (flange end surface 32c) configured to connect the first flange surface and the second flange surface, the planar member includes a first layer (first layer 21) including a first-layer end surface (first-layer end surface 21a) having a first thickness, the first-layer end surface being disposed between the third surface and the fourth surface and around the first tubular portion, and a second layer (second layer 22) having a smaller area than the first layer and including a second-layer end surface (second-layer end surface 22a) having a second thickness, the second-layer end surface being disposed between the third surface and the fourth surface and in at least a part of a periphery of the first tubular portion, and being disposed along the first layer and closer to the circuit board than the first layer, the first layer of the planar member includes a first region (first region 23) in which the second layer is disposed and a second region (second region 24) in which the second layer is not disposed, the first layer of the planar member includes a fifth surface (fifth surface 20c) opposite to the third surface in the second region, the fifth surface of the first layer of the planar member is fixed to the first flange surface of the flange portion of the lens unit, and is fixed to an end portion (end portion 63) of the second tubular portion of the housing, and the second-layer end surface of the second layer of the planar member has at least one second-layer protrusion (second-layer protrusion 22c) protruding toward an inner surface of the second tubular portion of the housing and abutting on the inner surface of the second tubular portion of the housing.

The vehicular camera assumes variations of products having various sizes, performances, and the like. In particular, in the circuit board, specifications such as performance, size, and shape thereof are changed depending on the products. With the change of the circuit board, it is necessary to change a size of the second tubular portion of the housing, and with the change in size of the second tubular portion, it becomes necessary to change a size of the lens unit, especially a design of the flange portion. However, the lens unit is a precise optical component, and changing the design thereof is not easy and requires effort, cost, time, and the like.

On the other hand, in the vehicular camera, the planar member, which can be manufactured easily at relatively low cost, has a two-layer structure including the first layer and the second layer. With the structure, even if the change in size of the second tubular portion occurs due to the change of the circuit board for each product of the vehicular camera, a gap between the second tubular portion of the housing and the flange portion of the lens unit can be filled by changing a size of the second layer without changing the lens unit. Further, the ring member can be easily fixed to the second tubular portion of the housing due to the action of the second-layer protrusion of the second layer. As a result, even if the size of the second tubular portion of the housing changes with the change of the circuit board, it is possible to prevent light from entering the housing from the outside due to the design change of the ring member without changing the lens unit. Thus, it is possible to increase variations of the vehicular camera while reducing effort, cost, time, and the like.

(A2) The vehicular camera according to (A1), in which the first thickness of the first layer of the planar member is smaller than the second thickness of the second layer of the planar member.

Accordingly, the second layer can efficiently prevent the light from entering the housing from the outside.

(A3) The vehicular camera according to (A1), in which first light transmittance of the first layer for light with a predetermined wavelength is larger than second light transmittance of the second layer for the light with the predetermined wavelength.

Accordingly, the first layer can be smoothly fixed to the flange portion of the lens unit and the end portion of the second tubular portion of the housing by laser welding, and the second layer can efficiently prevent the light from entering the housing from the outside.

(A4) The vehicular camera according to (A1), in which the planar member is formed by laser welding of the first layer and the second layer or two-color molding of a resin material of the first layer and a resin material of the second layer.

Accordingly, the planar member can be easily manufactured.

(A5) The vehicular camera according to (A1), in which the second layer of the planar member has a first rectangle including a first side (first side 22A) and a second side (second side 22B) opposite to the first side in a plan view of the planar member, the second-layer end surface of the second layer of the planar member has a first second-layer end surface (first second-layer end surface 22a1) corresponding to the first side, the second-layer end surface of the second layer of the planar member has a second second-layer end surface (second second-layer end surface 22a2) corresponding to the second side, and the at least one second-layer protrusion of the second layer of the planar member includes a first second-layer protrusion (first second-layer protrusion 22c1) disposed on the first second-layer end surface of the second layer of the planar member, a second second-layer protrusion (second second-layer protrusion 22c2) disposed on the second second-layer end surface of the second layer of the planar member, and a third second-layer protrusion (third second-layer protrusion 22c3) disposed on the second second-layer end surface of the second layer of the planar member.

Accordingly, the second layer can be easily manufactured, and the second layer can be firmly fixed to the second tubular portion of the housing by three second-layer protrusions.

(A6) The vehicular camera according to (A5), in which the first second-layer protrusion of the second layer of the planar member is disposed at a center of the first second-layer end surface of the second layer of the planar member, the second second-layer protrusion of the second layer of the planar member is disposed at a position separated by a first distance from a center of the second second-layer end surface, and the third second-layer protrusion of the second layer of the planar member is disposed at a position separated by a second distance from the center of the second second-layer end surface.

Accordingly, the three second-layer protrusions can firmly fix the second layer to the second tubular portion of the housing.

(A7) The vehicular camera according to (A1), in which a length of the first distance is the same as a length of the second distance.

Accordingly, since the second second-layer protrusion and the third second-layer protrusion are formed at equal distances from the center of the second second-layer end surface, the second layer can be stably fixed to the second tubular portion of the housing.

(A8) The vehicular camera according to (A1), in which the flange portion of the lens unit has a second rectangle including a third side (third side 320A) and a fourth side (fourth side 320B) opposite to the third side in a plan view of the flange portion, the flange end surface of the flange portion of the lens unit has a first flange end surface (first flange end surface 32c1) corresponding to the third side, the flange end surface of the flange portion of the lens unit has a second flange end surface (second flange end surface 32c2) corresponding to the fourth side, and the flange end surface has a first flange protrusion (first flange protrusion 33a) disposed at a center of the first flange end surface of the flange portion so as to protrude from the first flange end surface toward an inner surface of the second layer and come into contact therewith, a second flange protrusion (second flange protrusion 33b) disposed on the second flange end surface of the flange portion and at a position separated by a third distance from a center of the second flange end surface of the flange portion, and a third flange protrusion (third flange protrusion 33*c*) disposed at a position separated by a fourth distance from the center of the second flange end surface of the flange portion.

Accordingly, the three flange protrusions formed on the flange end surface can firmly fix the flange portion of the lens unit to the inner surface of the second layer.

(A9) The vehicular camera according to (A8), in which a length of the third distance is the same as a length of the fourth distance.

Accordingly, since the second flange protrusion and the third flange protrusion are formed at equal distances from the center of the second flange end surface, the flange portion of the lens unit can be stably fixed to the inner surface of the second layer.

(A10) The vehicular camera according to (A9), in which a fifth distance between the second second-layer protrusion and the third second-layer protrusion on the second second-layer end surface of the second layer is larger than a sixth distance between the second flange protrusion and the third flange protrusion on the second flange end surface of the flange portion.

Accordingly, the two second-layer protrusions are disposed outside the two flange protrusions with reference to the optical axis, and the distance between the two second-layer protrusions is larger than the distance between the two flange protrusions. Thus, the second layer can be stably fixed to the second tubular portion of the housing, and the flange portion of the lens unit can be stably fixed to the inner surface of the second layer.

(A11) The vehicular camera according to (A10), in which the inner surface of the second layer includes at least a first accommodation portion (first accommodation portion 22*d*) configured to accommodate the second flange protrusion and a second accommodation portion (second accommodation portion 22*e*) configured to accommodate the third flange protrusion.

Accordingly, the flange portion of the lens unit can be stably fixed to the inner surface of the second layer.

(A12) The vehicular camera according to (A11), in which the first accommodation portion of the second layer includes a first concave portion (first concave portion 22*d*1) in a direction from the inner surface of the second layer toward the second second-layer end surface, the second accommodation portion of the second layer includes a second concave portion (second concave portion 22*e*1) in the direction from the inner surface of the second layer toward the second second-layer end surface, and the first concave portion and the second concave portion are separated by the sixth distance.

Accordingly, the flange portion of the lens unit can be stably fixed to the inner surface of the second layer.

(A13) The vehicular camera according to (A12), in which the first rectangle of the second layer is an oblong, and the first side of the first rectangle and the second side of the first rectangle are long sides of the oblong.

Accordingly, the second layer can be easily manufactured.

(A14) The vehicular camera according to (A13), in which the second layer has a third concave portion (third concave portion 26) on the fourth surface of the second layer in a direction from the fourth surface toward the third surface.

Accordingly, a weight of the planar member can be reduced.

(A15) The vehicular camera according to (A14), in which the second layer has a fourth concave portion (fourth concave portion 27) different from the third concave portion on the fourth surface of the second layer in the direction from the fourth surface toward the third surface.

Accordingly, a weight of the planar member can be reduced.

(A16) The vehicular camera according to (A15), in which the second tubular portion of the housing includes a first side wall portion (first side wall portion 64) having a first inner surface (first inner surface 64*a*) and a second side wall portion (second side wall portion 65) facing the first side wall portion and having a second inner surface (second inner surface 65*a*), the inner surface of the second layer includes a first second-layer inner surface (first second-layer inner surface 22*f*) and a second second-layer inner surface (second second-layer inner surface 22*g*), the first second-layer protrusion of the second layer is in contact with the first inner surface of the first side wall portion of the housing, the second second-layer protrusion of the second layer is in contact with the second inner surface of the second side wall portion of the housing, the third second-layer protrusion of the second layer is in contact with the second inner surface of the second side wall portion of the housing, the first flange protrusion of the flange portion is in contact with the first second-layer inner surface of the second layer, the second flange protrusion of the flange portion is in contact with the second second-layer inner surface of the second layer, and the third flange protrusion of the flange portion is in contact with the second second-layer inner surface of the second layer.

Accordingly, the one second-layer protrusion and the two second-layer protrusions are in contact with each of the two opposing side wall portions of the housing, respectively, the one flange protrusion of the flange portion is in contact with the first second-layer inner surface, and the two flange protrusions are in contact with the second second-layer inner surface. Thus, the second layer can be firmly and stably fixed to the second tubular portion of the housing, and the flange portion of the lens unit can be firmly and stably fixed to the inner surface of the second layer.

(B1) A vehicular camera including:

a lens unit (lens unit 30) including a first tubular portion (first tubular portion 37) having a first tubular shape and at least one lens disposed inside the first tubular portion;

a circuit board (circuit board 40) including a first surface (first surface 40*a*), and a second surface (second surface 40*b*) opposite to the first surface;

an imaging element (imaging element 50) disposed on an optical axis (optical axis L) of the lens and on the first surface of the circuit board;

a housing (housing 60) having a second tubular portion (large-diameter tubular portion 61) having a second tubular shape along the optical axis and an end surface portion (ring member 20) covering a part of an end portion of the second tubular portion and configured to accommodate at least the circuit board and the imaging element inside the second tubular portion, the end surface portion of the second tubular portion supporting the lens unit; and a cap member (cap member 10) provided around the first tubular portion of the lens unit and having a third tubular portion (third tubular portion 15), in which the third tubular portion of the cap member includes a cap end portion (cap end portion 16) facing the end surface portion of the second tubular portion, and a first projection (first projection 11), a second projection (second projection 12), and a third projection (third projection 13) that protrude toward the inside of the second tubular portion of the housing, the end surface portion of the second tubular portion of the housing includes a first engaging portion (first engaging portion 201) configured to engage with the first projection of the cap member, a second engaging portion (second engaging portion 202) configured to engage with the second projection of the cap member, and a third engaging portion (third engaging portion 203) configured to engage with the third projection of the cap member, and the end surface portion of the second tubular portion of the housing includes a first convex portion (first convex portion 211), a second convex portion (second convex portion 212), and a third convex portion (third convex portion 213) that protrude in a direction away from the first surface of the circuit board and abut on at least a part of the cap end portion of the cap member in a direction along the optical axis.

The vehicular camera assumes variations of products having various sizes, performances, and the like. In particular, in the imaging element, the performance thereof is changed depending on the products. With the change of the imaging element, it is necessary to change a projection amount of the first tubular portion of the lens unit in a Z-axis direction from the viewpoint of focus adjustment or the like. If the projection amount of the first tubular portion is changed, it is necessary to change the design of the cap member, but from the viewpoint of reducing cost, effort, and the like, it is desirable to use a common cap member for a plurality of products.

In the vehicular camera, the end surface portion of the second tubular portion of the housing includes the first engaging portion, the second engaging portion, and the third engaging portion that respectively engage with the first projection, the second projection, and the third projection of the cap member. Further, the ring member includes the first convex portion, the second convex portion, and the third convex portion that abut on at least a part of the cap end portion of the cap member. With the structure, even when the projection amount of the first tubular portion is changed due to the change of the imaging element for each product of the vehicular camera, a position of the cap member in the Z-axis direction can be adjusted by changing the end surface portion without changing the cap member. In particular, by changing projection amounts of the first convex portion, the second convex portion, and the third convex portion of the ring member in the Z-axis direction, the position of the cap member in the Z-axis direction can be adjusted, and the cap member and the end surface portion can be engaged with each other while aligning with the first tubular portion. Thus, the cost, effort, and the like necessary for changing the design of the cap member can be reduced.

(B2) The vehicular camera according to (B1), in which
the end surface portion of the housing includes a flat plate-shaped planar member (ring member 20) fixed to the end portion of the second tubular portion of the housing.

Accordingly, it is possible to more easily manufacture the end surface portion of the housing using a flat plate-shaped planar member.

(B3) The vehicular camera according to (B2), in which
the planar member includes a third surface (third surface 20a) and a fourth surface (fourth surface 20b) opposite to the third surface, and the planar member is welded over an entire circumference by the fourth surface of the planar member and the end portion of the second tubular portion of the housing.

Accordingly, the end portion of the housing and the planar member can be firmly fixed.

(B4) The vehicular camera according to (B1), in which
an outer shape of the third tubular portion of the cap member has a first rectangle including a first corner (first corner 15a), a second corner (second corner 15b), a third corner (third corner 15c), and a fourth corner (fourth corner 15d) in a plan view, the planar member has an opening (opening 25) configured to allow the first tubular portion of the lens unit to pass therethrough, the opening of the planar member has a second rectangle including a fifth corner (fifth corner 25a), a sixth corner (sixth corner 25b), a seventh corner (seventh corner 25c), and an eighth corner (eighth corner 25d) in the plan view, the first projection of the cap member is formed corresponding to the first corner of the first rectangle, the second projection of the cap member is formed corresponding to the second corner of the first rectangle, the third projection of the cap member is formed corresponding to the third corner of the first rectangle, a fourth projection (fourth projection 14) further included in the cap member is formed corresponding to the fourth corner of the first rectangle, the first engaging portion of the planar member is formed corresponding to the fifth corner of the second rectangle, the second engaging portion of the planar member is formed corresponding to the sixth corner of the second rectangle, the third engaging portion of the planar member is formed corresponding to the seventh corner of the second rectangle, and a fourth engaging portion (fourth engaging portion 204) further included in the planar member is formed corresponding to the eighth corner of the second rectangle.

Accordingly, it is possible to easily manufacture the third tubular portion of the cap member and the opening of the planar member, and it is possible to easily form four projections of the cap member and four engaging portions of the planar member.

(B5) The vehicular camera according to (B4), in which
the second rectangle of the opening of the planar member includes a first side (first side 251), a second side (second side 252) intersecting the first side, a third side (third side 253) intersecting the second side, and a fourth side (fourth side 254) intersecting the third side, the first projection of the cap member includes a first leg portion (first leg portion 11a) extending from the third tubular portion of the cap member so as to pass through the opening of the planar member and a first claw portion (first claw portion 11b) extending from a tip portion of the first leg portion, the first engaging portion of the planar member includes a first standing ridge (first standing ridge 201a) standing from the third surface of the planar member toward the cap end portion of the cap member at the fifth corner of the second rectangle of the opening of the planar member, the first standing ridge of the planar member includes a first engaging surface (first engaging surface 201b) facing the opening of the planar member and configured to engage with the first claw portion of the cap member, a first standing surface (first standing surface 201c) standing from the first side in the second rectangle of the opening of the planar member, and a second standing surface (second standing surface 201d) standing from the second side in the second rectangle of the opening of the planar member, and the first standing surface and the second standing surface of the first standing ridge of the planar member are inclined toward a center of a plan view of the planar member in the direction along the optical axis.

Accordingly, the first claw portion of the first projection of the cap member and the first engaging surface of the first standing ridge of the first engaging portion are firmly engaged with each other. During laser welding of the flange portion of the lens unit and the ring member, a laser for welding is emitted to a position between the first standing ridge and the first convex portion from above along the Z-axis direction. If the first standing ridge is present at a position through which a laser for welding passes, the welding may be hindered. However, since the first standing surface and the second standing surface closest to the laser for welding are inclined toward the center of the plan view of the ring member in the direction along the optical axis L, the laser for welding reaches the ring member and the flange portion without coming into contact with the first standing ridge. Thus, the laser welding of the flange portion and the ring member can be performed smoothly.

(B6) The vehicular camera according to (B5), in which
the first claw portion of the cap member includes a first edge (first edge 11b1) facing the first side of the second rectangle of the opening of the planar member, a second edge (second edge 11b2) facing the second side of the second rectangle of the opening of the planar member, and a third edge (third edge 11b3) connecting the first edge and the second edge,
the first edge, the second edge, and the third edge are disposed on the first engaging surface of the first standing ridge of the planar member, and
the first edge and the second edge of the first claw portion of the cap member are chamfered.

Accordingly, the two edges facing the sides of the opening are chamfered in the first claw portion, and the first claw portion can smoothly engage with the first engaging surface of the first standing ridge.

(B7) The vehicular camera according to (B5), in which
the first convex portion of the planar member abuts on the cap end portion corresponding to the first corner of the first rectangle of the third tubular portion of the cap member,
the second convex portion of the planar member abuts on the cap end portion corresponding to the second corner of the first rectangle of the third tubular portion of the cap member, and
the third convex portion of the planar member abuts on the cap end portion corresponding to the third corner of the first rectangle of the third tubular portion of the cap member.

Accordingly, since at least three convex portions of the planar member abut on the cap end portion of the cap member, the cap member can be stably disposed on the planar member.

(B8) The vehicular camera according to (B7), in which
the lens unit includes a flange portion (flange portion 32) disposed outside the first tubular portion so as to extend outward with reference to the optical axis of the at least one lens over an entire periphery around the optical axis.

Accordingly, since the flange portion is provided, the lens unit can be supported by the end portion of the second tubular portion of the housing.

(B9) The vehicular camera according to (B8), in which
the flange portion of the lens unit includes a first flange surface (first flange surface 32a), a second flange surface (second flange surface 32b) opposite to the first flange surface and facing the first surface of the circuit board, and a flange end surface (flange end surface 32c) connecting the first flange surface and the second flange surface, and
the fourth surface of the planar member is fixed to the first flange surface of the flange portion of the lens unit.

Accordingly, the lens unit can be supported by the end portion of the second tubular portion of the housing via the planar member.

(B10) The vehicular camera according to (B9), in which
the first flange surface of the flange portion of the lens unit is welded to the fourth surface of the planar member between the first standing ridge and the first convex portion of the planar member in a cross-sectional view of the planar member and the flange portion of the lens unit in the direction along the optical axis.

Accordingly, during laser welding of the planar member and the flange portion, the first standing ridge and the first convex portion can be prevented from interfering with the irradiation of the laser.

(B11) The vehicular camera according to (B6), in which
the cap member includes a fourth tubular portion having a second cross section orthogonal to the optical axis of the third tubular portion having a smaller cross-sectional area than a first cross section and continuously formed with the third tubular portion.

Accordingly, the fourth tubular portion of the cap member can be easily disposed around the first tubular portion of the lens unit, and the first tubular portion can be protected.

(B12) The vehicular camera according to (B11), in which
the planar member further includes a fourth convex portion that protrudes in the direction away from the first surface of the circuit board and abuts on at least a part of the cap end portion of the cap member in the direction along the optical axis,
the first convex portion, the second convex portion, the third convex portion, and
the fourth convex portion of the planar member are polygonal, and
the second cross section of the cap member orthogonal to the optical axis is circular.

Accordingly, since the four convex portions of the planar member abut on the cap end portion of the cap member, the cap member can be stably disposed on the planar member. Since the fourth tubular portion has a circular cross section, the fourth tubular portion fits around the first tubular portion having a tubular shape and can appropriately protect the first tubular portion.

(B13) The vehicular camera according to (B12), in which the first projection, the second projection, the third projection, and the fourth projection of the cap member each have a snap-fit shape.

Accordingly, the first projection, the second projection, the third projection, and the fourth projection have elasticity, and the cap member can be easily removed from the planar member.

(B14) The vehicular camera according to (B5), in which the second projection of the cap member includes a second leg portion (second leg portion 12*a*) extending from the third tubular portion of the cap member so as to pass through the opening of the planar member, and a second claw portion (second claw portion 12*b*) extending from a tip portion of the second leg portion, the third projection of the cap member includes a third leg portion (third leg portion 13*a*) extending from the third tubular portion of the cap member so as to pass through the opening of the planar member, and a third claw portion (third claw portion 13*b*) extending from a tip portion of the third leg portion, the fourth projection of the cap member includes a fourth leg portion (fourth leg portion 14*a*) extending from the third tubular portion of the cap member so as to pass through the opening of the planar member, and a fourth claw portion (fourth claw portion 14*b*) extending from a tip portion of the fourth leg portion, the second engaging portion of the planar member includes a second standing ridge (second standing ridge 202*a*) standing from the third surface of the planar member toward the cap end portion of the cap member at the sixth corner of the second rectangle of the opening of the planar member, the third engaging portion of the planar member includes a third standing ridge (third standing ridge 203*a*) standing from the third surface of the planar member toward the cap end portion of the cap member at the seventh corner of the second rectangle of the opening of the planar member, the fourth engaging portion of the planar member includes a fourth standing ridge (fourth standing ridge 204*a*) standing from the third surface of the planar member toward the cap end portion of the cap member at the eighth corner of the second rectangle of the opening of the planar member, the second standing ridge of the planar member includes a second engaging surface (second engaging surface 202*b*) facing the opening of the planar member and configured to engage with the second claw portion of the cap member, a third standing surface (third standing surface 202*c*) standing from the second side in the second rectangle of the opening of the planar member, and a fourth standing surface (fourth standing surface 202*d*) standing from the third side in the second rectangle of the opening of the planar member, the third standing ridge of the planar member includes a third engaging surface (third engaging surface 203*b*) facing the opening of the planar member and configured to engage with the third claw portion of the cap member, a fifth standing surface (fifth standing surface 203*c*) standing from the third side in the second rectangle of the opening of the planar member, and a sixth standing surface (sixth standing surface 203*d*) standing from the fourth side in the second rectangle of the opening of the planar member, the fourth standing ridge of the planar member includes a fourth engaging surface (fourth engaging surface 204*b*)

facing the opening of the planar member and configured to engage with the fourth claw portion of the cap member, a seventh standing surface (seventh standing surface 204*c*) standing from the fourth side in the second rectangle of the opening of the planar member, and an eighth standing surface (eighth standing surface 204*d*) standing from the first side in the second rectangle of the opening of the planar member, the third standing surface and the fourth standing surface of the second standing ridge of the planar member are inclined toward the center of the plan view of the planar member in the direction along the optical axis, the fifth standing surface and the sixth standing surface of the third standing ridge of the planar member are inclined toward the center of the plan view of the planar member in the direction along the optical axis, and the seventh standing surface and the eighth standing surface of the fourth standing ridge of the planar member are inclined toward the center of the plan view of the planar member in the direction along the optical axis.

Accordingly, the second to fourth claw portions of the second to fourth projections of the cap member and the second to fourth engaging surfaces of the second to fourth standing ridges of the second to fourth engaging portions are firmly engaged with each other. During laser welding of the flange portion of the lens unit and the ring member, the laser for welding is emitted to positions between the second to fourth standing ridges and the second to fourth convex portions from above along the Z-axis direction. If the second to fourth standing ridges are present at the positions through which the laser for welding passes, the welding may be hindered. However, since each standing surface closest to the laser for welding is inclined toward the center of the plan view of the ring member in the direction along the optical axis L, the laser for welding reaches the ring member and the flange portion without coming into contact with the second to fourth standing ridges. Thus, the laser welding of the flange portion and the ring member can be performed smoothly.

Although the embodiments have been described above with reference to the accompanying drawings, the present disclosure is not limited thereto. It is apparent to those skilled in the art that various modifications, corrections, substitutions, additions, deletions, and equivalents can be conceived within the scope described in the claims, and it is understood that such modifications, corrections, substitutions, additions, deletions, and equivalents also fall within the technical scope of the present disclosure. In addition, constituent elements in the embodiment described above may be freely combined without departing from the gist of the invention.

INDUSTRIAL APPLICABILITY

The present disclosure is useful as a vehicular camera that can be manufactured at low cost and ensures excellent imaging performance.

What is claimed is:
1. A vehicular camera comprising:
a lens unit including a first tubular portion having a first tubular shape, at least one lens disposed inside the first tubular portion, and a flange portion disposed outside the first tubular portion so as to extend outward with reference to an optical axis of the at least one lens over an entire periphery of the optical axis;

a circuit board including a first surface and a second surface opposite to the first surface;

an imaging element disposed on the optical axis of the lens and on the first surface of the circuit board;

a housing having a second tubular portion having a second tubular shape along the optical axis and configured to accommodate at least the circuit board and the imaging element inside the second tubular portion; and a planar member disposed around the first tubular portion of the lens unit and having a third surface and a fourth surface opposite to the third surface and closer to the circuit board than the third surface, wherein the flange portion of the lens unit includes a first flange surface, a second flange surface opposite to the first flange surface and located in an internal space of the second tubular portion of the housing, and a flange end surface configured to connect the first flange surface and the second flange surface, the planar member includes a first layer including a first-layer end surface having a first thickness, the first-layer end surface being disposed between the third surface and the fourth surface and around the first tubular portion, and a second layer having a smaller area than the first layer and including a second-layer end surface having a second thickness, the second-layer end surface being disposed between the third surface and the fourth surface and in at least a part of a periphery of the first tubular portion, and being disposed along the first layer and closer to the circuit board than the first layer, the first layer of the planar member includes a first region in which the second layer is disposed and a second region in which the second layer is not disposed, the first layer of the planar member includes a fifth surface opposite to the third surface in the second region, the fifth surface of the first layer of the planar member is fixed to the first flange surface of the flange portion of the lens unit, and is fixed to an end portion of the second tubular portion of the housing, and the second-layer end surface of the second layer of the planar member has at least one second-layer protrusion protruding toward an inner surface of the second tubular portion of the housing and abutting on the inner surface of the second tubular portion of the housing.

2. The vehicular camera according to claim 1, wherein the first thickness of the first layer of the planar member is smaller than the second thickness of the second layer of the planar member.

3. The vehicular camera according to claim 1, wherein first light transmittance of the first layer for light with a predetermined wavelength is larger than second light transmittance of the second layer for the light with the predetermined wavelength.

4. The vehicular camera according to claim 1, wherein the planar member is formed by laser welding of the first layer and the second layer or two-color molding of a resin material of the first layer and a resin material of the second layer.

5. The vehicular camera according to claim 1, wherein the second layer of the planar member has a first rectangle including a first side and a second side opposite to the first side in a plan view of the planar member, the second-layer end surface of the second layer of the planar member has a first second-layer end surface corresponding to the first side, the second-layer end surface of the second layer of the planar member has a second second-layer end surface corresponding to the second side, and the at least one second-layer protrusion of the second layer of the planar member includes a first second-layer protrusion disposed on the first second-layer end surface of the second layer of the planar member, a second second-layer protrusion disposed on the second second-layer end surface of the second layer of the planar member, and a third second-layer protrusion disposed on the second second-layer end surface of the second layer of the planar member.

6. The vehicular camera according to claim 5, wherein the first second-layer protrusion of the second layer of the planar member is disposed at a center of the first second-layer end surface of the second layer of the planar member, the second second-layer protrusion of the second layer of the planar member is disposed at a position separated by a first distance from a center of the second second-layer end surface, and the third second-layer protrusion of the second layer of the planar member is disposed at a position separated by a second distance from the center of the second second-layer end surface.

7. The vehicular camera according to claim 6, wherein a length of the first distance is the same as a length of the second distance.

8. The vehicular camera according to claim 5, wherein the flange portion of the lens unit has a second rectangle including a third side and a fourth side opposite to the third side in a plan view of the flange portion, the flange end surface of the flange portion of the lens unit has a first flange end surface corresponding to the third side, the flange end surface of the flange portion of the lens unit has a second flange end surface corresponding to the fourth side, and the flange end surface has a first flange protrusion disposed at a center of the first flange end surface of the flange portion so as to protrude from the first flange end surface toward an inner surface of the second layer and come into contact therewith, a second flange protrusion disposed on the second flange end surface of the flange portion and at a position separated by a third distance from a center of the second flange end surface of the flange portion, and a third flange protrusion disposed at a position separated by a fourth distance from the center of the second flange end surface of the flange portion.

9. The vehicular camera according to claim 8, wherein a length of the third distance is the same as a length of the fourth distance.

10. The vehicular camera according to claim 9, wherein a fifth distance between the second second-layer protrusion and the third second-layer protrusion on the second second-layer end surface of the second layer is larger than a sixth distance between the second flange protrusion and the third flange protrusion on the second flange end surface of the flange portion.

11. The vehicular camera according to claim 10, wherein the inner surface of the second layer includes at least a first accommodation portion configured to accommodate the second flange protrusion and a second accommodation portion configured to accommodate the third flange protrusion.

12. The vehicular camera according to claim 11, wherein the first accommodation portion of the second layer includes a first concave portion in a direction from the inner surface of the second layer toward the second second-layer end surface, the second accommodation portion of the second layer includes a second concave portion in the direction from the inner surface of the second layer toward the second second-layer end surface, and the first concave portion and the second concave portion are separated by the sixth distance.

13. The vehicular camera according to claim 12, wherein the first rectangle of the second layer is an oblong, and the first side of the first rectangle and the second side of the first rectangle are long sides of the oblong.

14. The vehicular camera according to claim 13, wherein the second layer has a third concave portion on the fourth surface of the second layer in a direction from the fourth surface toward the third surface.

15. The vehicular camera according to claim 14, wherein the second layer has a fourth concave portion different from the third concave portion on the fourth surface of the second layer in the direction from the fourth surface toward the third surface.

16. The vehicular camera according to claim 15, wherein the second tubular portion of the housing includes a first side wall portion having a first inner surface and a second side wall portion facing the first side wall portion and having a second inner surface, the inner surface of the second layer includes a first second-layer inner surface and a second second-layer inner surface, the first second-layer protrusion of the second layer is in contact with the first inner surface of the first side wall portion of the housing, the second second-layer protrusion of the second layer is in contact with the second inner surface of the second side wall portion of the housing, the third second-layer protrusion of the second layer is in contact with the second inner surface of the second side wall portion of the housing, the first flange protrusion of the flange portion is in contact with the first second-layer inner surface of the second layer, the second flange protrusion of the flange portion is in contact with the second second-layer inner surface of the second layer, and the third flange protrusion of the flange portion is in contact with the second second-layer inner surface of the second layer.

* * * * *